US012711430B2

(12) United States Patent
Singh et al.

(10) Patent No.: US 12,711,430 B2
(45) Date of Patent: Aug. 18, 2026

(54) PROCESSORS AND METHODS FOR SELECTING A TARGET MODEL FOR AN UNLABELED DATASET

(71) Applicant: Huawei Cloud Computing Technologies Co., Ltd., Guizhou (CN)

(72) Inventors: Gursimran Singh, Delta (CA); Xinglu Wang, Burnaby (CA); Yong Zhang, Richmond (CA); Mohammad Akbari, Coquitlam (CA)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 842 days.

(21) Appl. No.: 18/145,912

(22) Filed: Dec. 23, 2022

(65) Prior Publication Data

US 2024/0211812 A1 Jun. 27, 2024

(51) Int. Cl.
*G06N 20/20* (2019.01)
*G06F 16/2457* (2019.01)

(52) U.S. Cl.
CPC ....... *G06N 20/20* (2019.01); *G06F 16/24578* (2019.01)

(58) Field of Classification Search
CPC ..................................................... G06N 20/20
See application file for complete search history.

(56) References Cited

U.S. PATENT DOCUMENTS

| | | | | |
|---|---|---|---|---|
| 10,255,085 | B1 * | 4/2019 | Valsaraj | G06N 3/09 |
| 2019/0138946 | A1 * | 5/2019 | Asher | G06N 5/04 |
| 2020/0074340 | A1 * | 3/2020 | Abdi Taghi Abad | G06N 5/048 |
| 2022/0374274 | A1 * | 11/2022 | Chen | G06F 11/3447 |
| 2023/0015813 | A1 | 1/2023 | Wang et al. | |
| 2023/0334344 | A1 * | 10/2023 | Almasan | G06F 16/2255 |

* cited by examiner

*Primary Examiner* — Grace Park
(74) *Attorney, Agent, or Firm* — BCF LLP

(57) ABSTRACT

Methods and systems for selecting a target model for an unlabeled dataset of a dataset provider, the target model for generating labels for the unlabeled dataset. The method comprises acquiring the unlabeled dataset from the dataset provider; acquiring a first candidate model from a first model provider and a second candidate model from a second model provider, generating a first usefulness score for the first candidate model and a second usefulness score for the second candidate model using the unlabeled dataset, the first and second usefulness scores being indicative of likelihood that the first and second candidate models generate accurate labels for the unlabeled dataset respectively; selecting the first candidate model as the target model using the first usefulness score and the second usefulness score; and causing generation of the labels from the unlabeled dataset using the target model.

34 Claims, 11 Drawing Sheets

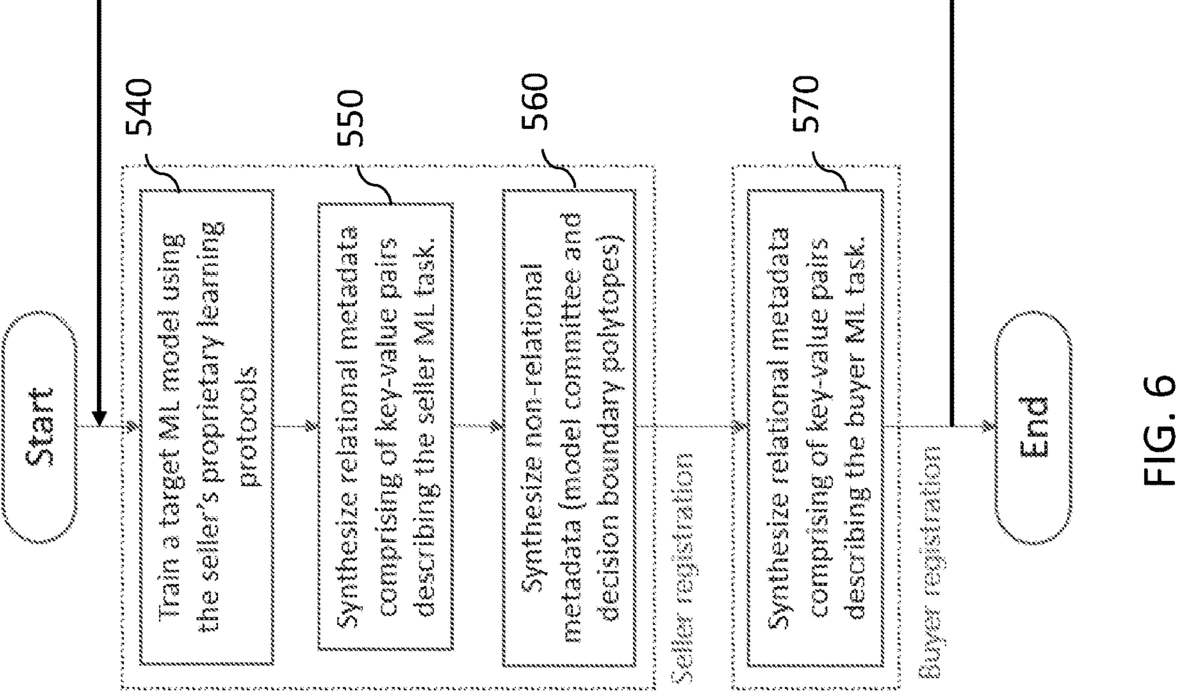
FIG. 6

PROCESSORS AND METHODS FOR SELECTING A TARGET MODEL FOR AN UNLABELED DATASET

FIELD OF THE TECHNOLOGY

The present technology relates to machine learning models (MLMs). In particular, methods and processors for estimating a confidence of machine learning models in predicting labels of an unlabeled dataset and selecting a target model for said unlabeled dataset are disclosed.

BACKGROUND

Machine Learning Models (MLMs) have recently gained traction in a wide range of applications. Typical end-to-end MLMs provide a user with an output generated based on one or more inputs. Obtaining machine learning models require specialized resources such as collecting labelled dataset, coding the learning algorithm and designing the network architecture. However, many users that desire to use functions of MLMs lack the ability to obtain these resources for training effective MLMs. Said users may thus desire to obtain, use or buy relevant MLMs from MLMs sellers. Multiple sellers desire to sell their trained MLMs while MLMs buyers aim to buy an MLM which is best suited for a given desired machine learning task. The central problem for a buyer is thus to select the best model for their particular desired machine learning task.

However, in use, buyers usually only have an unlabeled dataset corresponding to their desired machine learning tasks. Therefore, determining the most accurate and relevant MLM for a given desired machine learning task cannot be done by comparing outputs of a plurality of MLM. There is thus a desire for processors and method that enable selection of a target MLM for an unlabeled dataset.

SUMMARY

Developers have realized that dataset providers that desire to obtain a MLM for a given desired machine learning task usually have unlabeled dataset. As such, in response to a plurality of MLMs being provided to the dataset providers for use or purchase thereof, developers of the present technology have defined a problem referred to as a "Unlabeled Model Trading (UMT) problem". In the context of the present disclosure, for a given MLM $f_i$ of a model provider, and a given unlabeled dataset $D_B$ of the dataset provider, developers have defined the expected usefulness $U(D_B, f_i)$ of the MLM $f_i$ for the unlabeled dataset $D_B$. For example, the expected usefulness $U(D_B, f_i)$ may be indicative of an accuracy of predictions determined by the MLM $f_i$ for the unlabeled dataset $D_B$.

Assuming an unknown joint distribution of images and class labels, denoted by $P(X, y)$ where X represents the space of images and y represents the space of class labels, the UMT problem may be defined as follows. Given an unlabeled dataset sampled from the unknown distribution of images $$D_B \sim P(X),\ N\ MLMs\{f_i\}_{i=1}^{N},$$

and additional metadata $\gamma_i$ corresponding to each MLM, $f_i$, the problem of Unlabeled Model Trading (UMT) is to find the most accurate and reliable model such that:

$$\underset{i}{\mathrm{argmax}} \sum_{j=1}^{|D_B|} I\left(\underset{c}{\mathrm{argmax}} f_i(x_j) == \underset{c}{\mathrm{argmax}} P(y \mid x_j)\right)$$

where I is an indicator function, c represents number of classes, $x_j$ is a data point in $D_B$. Metadata $\gamma_i$ represents any additional aggregate information derived from the respective MLM $f_i$ or a corresponding model provider and its corresponding labelled dataset $D_i$. It should be noted that the ground-truth label $$\underset{c}{\mathrm{argmax}}$$

$P(y|x_j)$ may not be available for any $x_j \in D_B$.

Although illustrative examples and use case scenario are related to image classification and labeling in mind, systems, methods and processors disclosed herein may be readily used for other tasks like object detection, semantic segmentation, natural language pipelines, or any learning problem. As such, any system or method variation configured to select a target MLM for an unlabeled dataset can be adapted to execute implementations of the present technology, once teachings presented herein are appreciated.

Embodiments of the present technology have been developed based on developers' appreciation of shortcomings associated with the prior art. More specifically, it is believed that using unlabeled dataset as the search query from a dataset provider seeking to be provided with a MLM makes the technology practical since dataset providers who want to use and/or buy a MLM do not usually have any labelled dataset. It is contemplated that the dataset provider may seek to select a best MLM for the desired ML task from a plurality of MLMs.

In a first broad aspect of the present technology, there is provided a method of selecting a target model for an unlabeled dataset of a dataset provider, the target model for generating labels for the unlabeled dataset, the dataset provider being communicatively coupled to a server, the method executable by the server. The method includes acquiring, by the server, the unlabeled dataset from the dataset provider, acquiring, by the server, a first candidate model from a first model provider and a second candidate model from a second model provider, the first model provider and the second model provider being communicatively coupled to the server, the first candidate model having been trained based on first training data available to the first model provider, and the second candidate model having been trained based on second training data available to the second model provider, generating, by the server, a first usefulness score for the first candidate model and a second usefulness score for the second candidate model using the unlabeled dataset, the first usefulness score being indicative of likelihood that the first candidate model generates accurate labels for the unlabeled dataset, the second usefulness score being indicative of likelihood that the second candidate model will generate the accurate labels for the unlabeled dataset, selecting, by the server, the first candidate model as the target model using the first usefulness score and the second usefulness score and causing, by the server, generation of the labels from the unlabeled dataset using the target model.

In some non-limitative implementations of the present technology, the process of generating the first usefulness score includes generating, by the server employing the first candidate model, label-wise probabilities for respective input objects from the unlabeled dataset, generating, by the server, scores for respective input objects based on the respective label-wise probabilities, the scores being indicative of how confident the first candidate model is in a given label amongst a plurality of potential labels for the respective input objects, and generating, by the server, the first usefulness score based on a combination of the scores for respective input objects.

In some non-limitative implementations of the present technology, the scores are max scores for respective input objects and the combination of scores is an average max score for the input objects.

In some non-limitative implementations of the present technology, a given max score is $\alpha_x=\max_c P_\theta(\hat{y}_c|x)$; and the average max score is $$\frac{1}{|D_B|}\sum\nolimits_{x\in D_B}\alpha_x,$$

where x is an input object. $\hat{y}_c$ is a probability of the $c^{th}$ label, among C pre-determined labels, $P_\theta(\hat{y}_c|x)$ is a label-wise probability determined using a SoftMax function on final layer activations of a proposed model $\theta$ and $D_B$ is the unlabeled dataset.

In some non-limitative implementations of the present technology, the scores are entropy scores for respective input objects and the combination of scores is an average entropy score for the input objects.

In some non-limitative implementations of the present technology, a given entropy score is $\beta_x=-\Sigma_c P_\theta(\hat{y}_c|x)\cdot\log P_\theta(\hat{y}_c|x)$, the average entropy score is $$\frac{1}{|D_B|}\sum\nolimits_{x\in D_B}\beta_x,$$

where x is an input object, $\hat{y}_c$ is a probability of the $c^{th}$ label, among C labels, $P_\theta(\hat{y}_c|x)$ is a label-wise probability determined using a SoftMax function on final layer activations of a proposed model $\theta$; and $D_B$ is the unlabeled dataset.

In some non-limitative implementations of the present technology, the generating the first usefulness score includes receiving, by the server, an ensemble of models trained by the first model provider based on the first training data and pre-determined protocols, generating, by the server, agreement scores for respective input objects based on the ensemble of models, the agreement scores being indicative of similarity of predictions made by the ensemble of models for the respective input objects and generating, by the server, the first usefulness score based on a combination of the agreement scores for respective input objects.

In some non-limitative implementations of the present technology, the agreement scores are vote entropy scores for respective input objects and the combination of agreement scores is a vote entropy score for the input objects.

In some non-limitative implementations of the present technology, a given vote entropy score is $\alpha_x$ $$\alpha_x=-\sum\nolimits_c\frac{V(y_c)}{M}\log\frac{V(y_c)}{M}$$

and the average vote entropy score is $$\frac{1}{|D_B|}\sum\nolimits_{x\in D_B}\alpha_x,$$

and wherein M is a number of models in the ensemble of models, x is an input object, $\hat{y}_c$ is a probability of the $c^{th}$ label, among C labels, $V(y_c)$ represents a number of votes received for the $c^{th}$ label and $D_B$ is the unlabeled dataset.

In some non-limitative implementations of the present technology, the agreement scores are consensus probability scores for respective input objects and the combination of agreement scores is an average consensus probability for the input objects.

In some non-limitative implementations of the present technology, a given consensus probability score is $$\beta_x=\max_c\frac{1}{M}\sum\nolimits_{m\in|M|}P_{\theta_m}(\hat{y}_c\,|\,x),$$

the average consensus probability score is $$\frac{1}{|D_B|}\sum\nolimits_{x\in D_B}\beta_x,$$

and wherein $y_c$ is a probability of the $c^{th}$ label, among C labels, $P_{\theta_m}(\hat{y}_c|x)$ is a label-wise probability determined using a SoftMax function on final layer activations of a proposed model $\theta$, M is a number of models in the ensemble of models and DB is the unlabeled dataset.

In some non-limitative implementations of the present technology, the generating the first usefulness score includes generating, by the server, ground-truth labels for respective input objects from the unlabeled dataset using polytopes acquired from the first model provider and the second model provider, generating, by the server employing the first and second candidate models, predicted labels for respective input objects from the unlabeled dataset and generating, by the server, the first usefulness score based on a comparison of the predicted labels and the ground-truth labels for respective input objects.

In some non-limitative implementations of the present technology, the method further includes determining at least two of the following values for each candidate model: an average max score $$\frac{1}{|D_B|}\sum\nolimits_{x\in D_B}\alpha_x,$$

where $\alpha_x=\max_c P_\theta(\hat{y}_c|x)$, average entropy score $$\frac{1}{|D_B|}\sum\nolimits_{x\in D_B}\beta_x,$$

where $\beta_x = -\Sigma_c P_\theta(\hat{y}_c|x) \cdot \log P_\theta(\hat{y}_c|x)$, an average vote entropy score $$\frac{1}{|D_B|}\sum\nolimits_{x \in D_B} \alpha_x,$$

where $$\alpha_x = -\sum\nolimits_c \frac{V(y_c)}{M} \log \frac{V(y_c)}{M},$$

and an average consensus probability score $$\frac{1}{|D_B|}\sum\nolimits_{x \in D_B} \beta_x,$$

where $$\beta_x = \max_c \frac{1}{M} \sum\nolimits_{m \in |M|} P_{\theta_m}(\hat{y}_c \mid x),$$

where x is an input object, $y_c$ is a probability of the $c^{th}$ label, among C labels, $V(y_c)$ represents a number of votes received for the $c^{th}$ label, M is a number of models in the ensemble of models and $D_B$ is the unlabeled dataset, and a ground truth-based usefulness score based on a comparison of predicted labels and estimated ground-truth labels for respective input objects of the unlabeled dataset. The estimated ground-truth labels have been generated for respective input objects from the unlabeled dataset using polytopes acquired from the first model provider and the second model provider. The predicted labels have been generated for respective input objects from the unlabeled dataset by employing the first candidate model. The first usefulness score being based on the at least two values mentioned above.

In some non-limitative implementations of the present technology, labels are classes to classify input objects included in the unlabeled dataset.

In some non-limitative implementations of the present technology, labels are indicative of at least one of an object detection task or semantic segmentation task executed on the unlabeled dataset.

In some non-limitative implementations of the present technology, the method further includes, subsequent to acquiring the first and second candidate models, performing a metadata-based selection to identify a subset of potential target models including the first and second candidate models.

In some non-limitative implementations of the present technology, the causing generation of the labels from the unlabeled dataset using the target model includes transmitting, by the server, the target model to the dataset provider for generating the labels.

In some non-limitative implementations of the present technology, the causing generation of the labels from the unlabeled dataset using the target model includes generating, by the server, the labels using the target model.

In a second broad aspect of the present technology, there is provided a system for selecting a target model for an unlabeled dataset of a dataset provider, the target model for generating labels for the unlabeled dataset. The system includes a server for running a machine learning model (MLM) trading platform, the dataset provider being communicatively coupled to a server. The server is configured to acquire the unlabeled dataset from the dataset provider, acquire a first candidate model from a first model provider and a second candidate model from a second model provider, the first model provider and the second model provider being communicatively coupled to the server, the first candidate model having been trained based on first training data available to the first model provider, and the second candidate model having been trained based on second training data available to the second model provider, generate a first usefulness score for the first candidate model and a second usefulness score for the second candidate model using the unlabeled dataset, the first usefulness score being indicative of likelihood that the first candidate model generates accurate labels for the unlabeled dataset, the second usefulness score being indicative of likelihood that the second candidate model will generate the accurate labels for the unlabeled dataset, select the first candidate model as the target model using the first usefulness score and the second usefulness score and cause generation of the labels from the unlabeled dataset using the target model In some non-limitative implementations of the present technology, in order to generate the first usefulness score, the server is further configured to generate, by employing the first candidate model, label-wise probabilities for respective input objects from the unlabeled dataset, generate scores for respective input objects based on the respective label-wise probabilities, the scores being indicative of how confident the first candidate model is in a given label amongst a plurality of potential labels for the respective input objects and generate the first usefulness score based on a combination of the scores for respective input objects.

In some non-limitative implementations of the present technology, the scores are max scores for respective input objects and the combination of scores is an average max score for the input objects.

In some non-limitative implementations of the present technology, a given max score is $\alpha_x = \max_c P_\theta(\hat{y}_c|x)$; and the average max score is $$\frac{1}{|D_B|}\sum\nolimits_{x \in D_B} \alpha_x,$$

where x is an input object, $\hat{y}_c$ is a probability of the $c^{th}$ label, among C pre-determined labels, $P_\theta(\hat{y}_c|x)$ is a label-wise probability determined using a SoftMax function on final layer activations of a proposed model θ and $D_B$ is the unlabeled dataset.

In some non-limitative implementations of the present technology, the scores are entropy scores for respective input objects and the combination of scores is an average entropy score for the input objects.

In some non-limitative implementations of the present technology, a given entropy score is $\beta_x = -\Sigma_c P_\theta(\hat{y}_c|x) \cdot \log P_\theta(\hat{y}_c|x)$, the average entropy score is $$\frac{1}{|D_B|}\sum\nolimits_{x \in D_B} \beta_x,$$

where x is an input object, $\hat{y}_c$ is a probability of the $c^{th}$ label, among C labels, $P_\theta(\hat{y}_c|x)$ is a label-wise probability determined using a SoftMax function on final layer activations of a proposed model θ; and $D_B$ is the unlabeled dataset.

In some non-limitative implementations of the present technology, in order to generate the first usefulness score, the server is further configured to receive an ensemble of models trained by the first model provider based on the first training data and pre-determined protocols, generate agreement scores for respective input objects based on the ensemble of models, the agreement scores being indicative of similarity of predictions made by the ensemble of models for the respective input objects, and generate the first usefulness score based on a combination of the agreement scores for respective input objects.

In some non-limitative implementations of the present technology, the agreement scores are vote entropy scores for respective input objects and the combination of agreement scores is a vote entropy score for the input objects.

In some non-limitative implementations of the present technology, a given vote entropy score is $$\alpha_x = -\sum_c \frac{V(y_c)}{M}\log\frac{V(y_c)}{M};$$

and the average vote entropy score is $$\frac{1}{|D_B|}\Sigma_{x\in D_B}\ \alpha_x,$$

where M is a number of models in the ensemble of models, x is an input object, $\hat{y}_c$ is a probability of the $c^{th}$ label, among C labels, $V(y_c)$ represents the number of votes received for a particular given label on the input object x and $D_B$ is the unlabeled dataset.

In some non-limitative implementations of the present technology, the agreement scores are consensus probability scores for respective input objects and the combination of agreement scores is an average consensus probability for the input objects.

In some non-limitative implementations of the present technology, a given consensus probability score is $$\beta_x = \max_c \frac{1}{M}\Sigma_{m\in|M|}\ P_{\theta_m}\ (\hat{y}_c \mid x),$$

the average consensus probability score is $$\frac{1}{|D_B|}\Sigma_{x\in D_B}\ \beta_x,$$

where $y_c$ is a probability of the $c^{th}$ label, among C labels, $P_{\theta_m}(\hat{y}_c|x)$ is a label-wise probability determined using a SoftMax function on final layer activations of a proposed model θ, M is a number of models in the ensemble of models and DB is the unlabeled dataset.

In some non-limitative implementations of the present technology, in order to generate the first usefulness score, the server is further configured to generate ground-truth labels for respective input objects from the unlabeled dataset using polytopes acquired from the first model provider and the second model provider, generate, by employing the first candidate model, predicted labels for respective input objects from the unlabeled dataset and generate the first usefulness score based on a comparison of the predicted labels and the ground-truth labels for respective input objects.

In some non-limitative implementations of the present technology, the server is further configured to determine at least two of the following values for each candidate model: an average max score $$\frac{1}{|D_B|}\Sigma_{x\in D_B}\ \alpha_x,$$

where $\alpha_x=\max_c P_\theta(\hat{y}_c|x)$, average entropy score $$\frac{1}{|D_B|}\Sigma_{x\in D_B}\ \beta_x,$$

where $\beta_x=-\Sigma_c P_\theta(\hat{y}_c|x)\cdot\log P_\theta(\hat{y}_c|x)$, an average vote entropy score $$\frac{1}{|D_B|}\Sigma_{x\in D_B}\ \alpha_x,$$

where $$\alpha_x = -\Sigma_c \frac{V(y_c)}{M}\log\frac{V(y_c)}{M},$$

and an average consensus probability score $$\frac{1}{|D_B|}\Sigma_{x\in D_B}\ \beta_x,$$

where $$\beta_x = ax_c \frac{1}{M}\Sigma_{m\in|M|}\ P_{\theta_m}\ (\hat{y}_c \mid x),$$

where x is an input object, $y_c$ is a probability of the $c^{th}$ label, among C labels, $V(y_c)$ represents a number of votes received for the $c^{th}$ label, $P_{\theta_m}(\hat{y}_c|x)$ is a label-wise probability determined using a SoftMax function on final layer activations of a proposed model θ, M is a number of models in the ensemble of models and $D_B$ is the unlabeled dataset, and a ground truth-based usefulness score based on a comparison of predicted labels and ground-truth labels for respective input objects of the unlabeled dataset, the ground-truth labels having been generated for respective input objects from the unlabeled dataset using polytopes acquired from the first model provider and the second model provider and the predicted labels having been generated for respective input objects from the unlabeled dataset by employing the first candidate model, the first usefulness score being based on the at least two values.

In some non-limitative implementations of the present technology, labels are classes to classify input objects included in the unlabeled dataset.

In some non-limitative implementations of the present technology, the server is further configured to, subsequent to acquiring the first and second candidate models, perform a metadata-based selection to identify a subset of potential target models including the first and second candidate models.

In some non-limitative implementations of the present technology, in order to cause generation of the labels from the unlabeled dataset using the target model, the server is further configured to transmit the target model to the dataset provider for generating the labels.

In some non-limitative implementations of the present technology, in order to cause generation of the labels from the unlabeled dataset using the target model, the server is further configured to generate the labels using the target model.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "user device" is any computer hardware that is capable of running software appropriate to the relevant task at hand. Thus, some (non-limiting) examples of user devices include personal computers (desktops, laptops, netbooks, etc.), smartphones, and tablets, as well as network equipment such as routers, switches, and gateways. It should be noted that a device acting as a user device in the present context is not precluded from acting as a server to other user devices. The use of the expression "a user device" does not preclude multiple user devices being used in receiving/sending, carrying out or causing to be carried out any task or request, or the consequences of any task or request, or steps of any method described herein. It is contemplated that the user device and the server can be implemented as a same single entity. For example, this single entity could implement both the unlabeled dataset and a plurality of MLMs and could locally select the target MLM from the plurality of MLMs for the target dataset.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context), firmware, hardware, or a combination thereof, that is both necessary and sufficient to achieve the specific function(s) being referenced.

In the context of the present specification, the expression "computer usable information storage medium" or "computer-readable medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information clement may be retrieved. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 6 is a flow diagram showing operations of an implementation of the method of FIG. 5;

Figure 1:
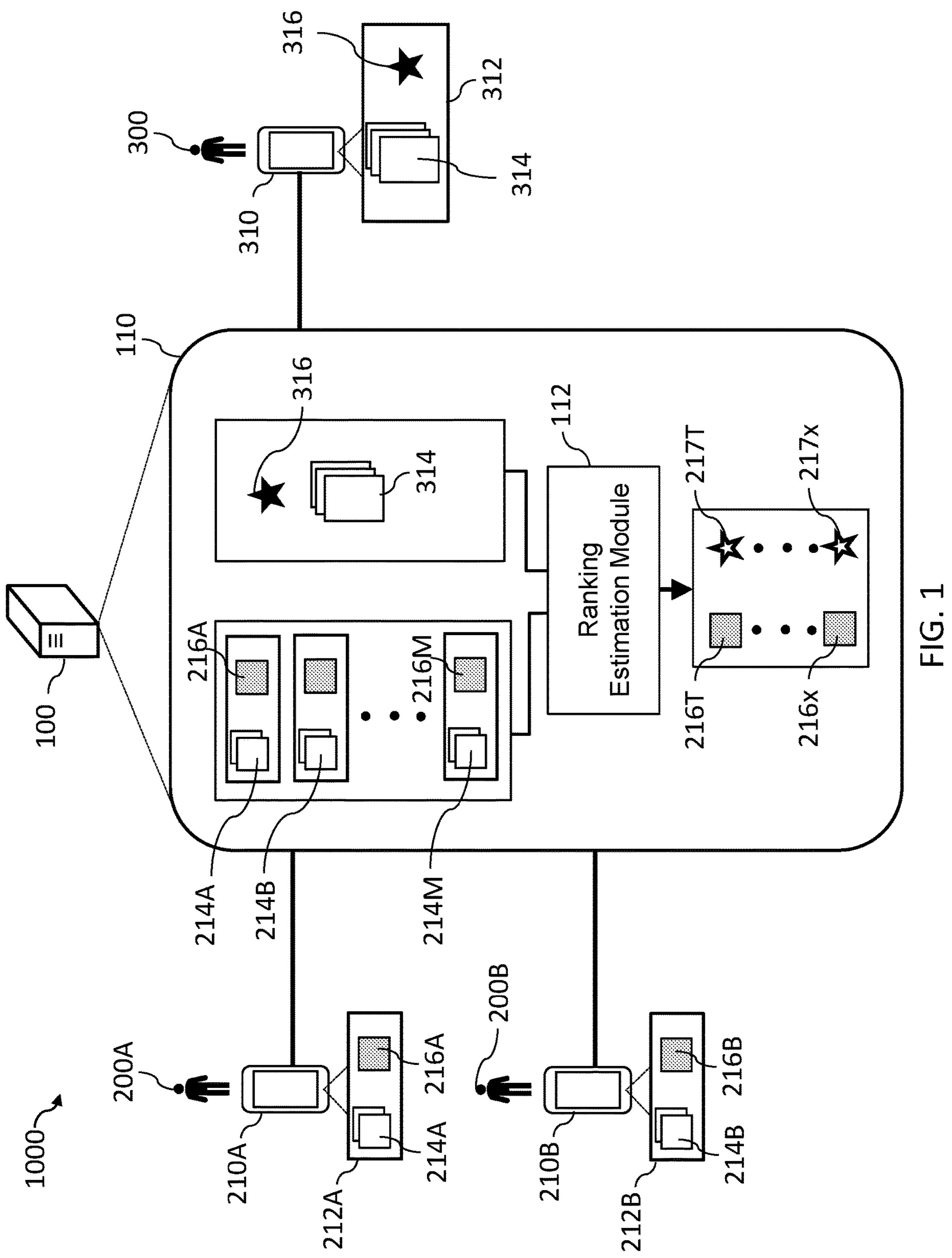
FIG. 1 is a schematic representation of a MLM trading environment in accordance with an embodiment of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagram herein represents conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

The functions of the various elements shown in the figures, including any functional block labeled as a "processor" or "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

In the context of the present disclosure, the terms "buyer" and "dataset provider" both refer to a same entity desiring to obtain a target MLM for performing a given desired machine learning task, the target MLM being the most accurate and reliable MLM generating inferences using a neural network-based architecture. More specifically, the MLM may include a Neural Network (NN), such that execution of the MLM corresponds to an execution of the corresponding NN.

With these fundamentals in place, we will now consider some non-limiting examples to illustrate various implementations of aspects of the present technology.

Referring to FIG. 1, there is shown a schematic diagram of an MLM trading environment 1000, the MLM trading environment 1000 including an MLM trading platform 110 operated by a server 100. The server 100 is thus suitable for implementing non-limiting embodiments of the present technology. It is to be expressly understood that the MLM trading environment 1000 as depicted is merely an illustrative implementation of the present technology. Thus, the description thereof that follows is intended to be only a description of illustrative examples of the present technology. This description is not intended to define the scope or set forth the bounds of the present technology. In some cases, what is believed to be helpful examples of modifications to the MLM trading environment 1000 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the MLM trading environment 1000 may provide in certain instances simple implementations of the present technology, and that where such is the case they have been presented in this manner as an aid to understanding. As persons skilled in the art would understand, various implementations of the present technology may be of a greater complexity.

Generally speaking, the server 100, by operating the MLM trading platform 110, enables model providers and dataset providers to interact such that dataset providers may use, obtain, and/or purchase models from the model providers. Broadly speaking, the server 100 may determine, based on an unlabeled dataset provided by the dataset provider, a target MLM being the most accurate and reliable model among the models provided by the model providers. The dataset provider may further buy the target MLM from the corresponding model provider through the MLM trading platform 110. The MLM trading platform 110 may thus be referred to as an "MLM marketplace" where the dataset provider is a buyer, and the model providers are sellers. The dataset providers and the model providers may be human entity, companies, firms, or any other entity that may find interest in using the MLM trading platform 110.

More specifically, with reference to FIG. 1, the MLM trading environment 1000 includes the server 100 that host, operate and run the MLM trading platform 110, one or more model providers 200A, 200B, each model provider being associated with a corresponding model provider device 210A, 210B communicably connected to the server 100 to access the MLM trading platform 110. The MLM trading environment 1000 also include one or more dataset providers 300, only one of which being shown for clarity of FIG. 1. The dataset provider 300 is associated with a corresponding dataset provider device 310 communicably connected to the server 100 to access the MLM trading platform 110. The server 100 is communicatively coupled to the model provider devices 210A, 210B and the dataset provider device 310 a same or different communication networks via any wired or wireless communication link including. for example, 4G, 5G LTE, Wi-Fi, or any other suitable connection. In some non-limiting implementations of the present technology, a given communication network may be implemented as the Internet. A given communication network can be implemented differently, such as any wide-area communication network, local-area communication network, a private communication network and the like. How the communication links between the server 100 is and the model provider devices 210A, 210B and the dataset provider device 310 are implemented will depend inter alia on how the server 100, the model provider devices 210A, 210B and the dataset provider device 310 are implemented.

In use, each model provider devices 210A, 210B transmits respective model provider data 212A, 212B to the server 100. More specifically, in this implementation, the model provider data 212A includes a candidate MLM 216A and associated metadata 214A. The candidate MLM 216A is an MLM that the model provider 200A desires to provide to potential dataset providers such as dataset provider 300. For example, the model provider 200A may desire to transmit the candidate MLM 216A to the server 100 for selling and/or leasing the candidate MLM 216A. Similarly, the model provider data 212B includes a candidate MLM 216B and associated metadata 214B. It should be noted that a given model provider may transmit a plurality of model provider data to the server, thereby transmitting a plurality of MLM, and associated metadata, to the server 100. In this implementation, the candidate MLM is trained before being transmitted to the server 100. As shown in FIG. 1, the server 100 stores a plurality of candidate MLMs 216A-216M received from one or more model providers along with corresponding metadata 214A-214M. The MLMs 216A-216M that may be stored and executed by the server 100, and more specifically by a computing unit thereof may be, for example and without limitations, forecasting (e.g. weather forecasting, traffic forecasting) algorithms, semantic segmentation, image recognition algorithms and natural language processing algorithms (e.g. textual and/or speech recognition and translation).

Non limitative examples of MLMs that can be transmitted to and/or executed by the server 100 may include models trained with linear regression, logistic regression, support vector machine, random forest, neural network, gradient boosting, adaboost, lasso, elastic net, ridge, bayesian ridge, Stochastic Gradient Descent (SGD) or any MLM that may generate predictions for a label distribution. Other MLMs and corresponding training algorithms may also be envisioned without departing from the scope of the present technology.

In this implementation, the metadata of a corresponding candidate MLM includes (i) a committee of models associated with the candidate MLM and trained using pre-determined protocols, and (ii) decision-boundary polytopes extracted from the candidate MLM. Use of the metadata is described in greater details hereinafter.

In use, the dataset provider 300 transmits, using the corresponding dataset provider device 310, dataset provider data 312 to the server 100. More specifically, in this implementation, the dataset provider data 312 includes an unlabeled dataset 314 and metadata 316, a combination of which being indicative of a desired machine learning task. For example, the desired machine learning task may be an image labeling task, the unlabeled dataset 314 including images to be labeled. Even though the illustrative examples recited herein are directed to the task of image labeling, other types of desired machine learning task are contemplated, such as semantic segmentation or object detection. As such, in some implementations, the labels may be indicative of at least one of an object detection task, an object localization task, and a semantic segmentation task executed on the unlabeled dataset 314.

One of the objectives of the MLM trading platform 110 is to determine, among the candidate MLM 216A-216M, the most accurate and reliable MLM for the desired machine learning task using the unlabeled dataset 314, said most accurate and reliable MLM being referred to as the "target MLM" 216T. To do so, the server 100 employs a Ranking Estimation Module (REM) 112 to rank the candidate MLM 216A-216M according to their respective performances to execute the desired machine learning task for the unlabeled dataset 314. The target MLM 216T may further be transmitted to the dataset provider 300 for use thereof.

In use, the server 100 generates a usefulness score 217, using the unlabeled dataset 314, for each of a plurality of candidate models 216A-216M. A generation of the usefulness score 217 is described in greater details herein after. Broadly speaking, in the illustrative use case scenario of image labeling, the usefulness score of a candidate MLM for the unlabeled dataset 314 is indicative of likelihood that the candidate MLM generates accurate labels for the unlabeled dataset 314.

The server 100 further selects the target MLM 216T based on usefulness scores 217 of the proposed MLMs. In the illustrative use case scenario of image labeling, the server 100 may subsequently execute the target MLM 216T to generate labels for the unlabeled dataset 314.

In one implementation, the MLM trading platform 110 may enable monetary transactions between the model providers and the dataset provider 300. In this implementation, the dataset provider 300 may purchase, through the MLM trading platform 110, the target MLM 216T to the corresponding model provider that transmitted the candidate MLM identified as the target MLM 216T.

In the depicted non-limiting implementation of the present technology, the server 100 is a single server. In alternative non-limiting implementations of the present technology, the functionality of the server 100 may be distributed and may be implemented via multiple servers or be performed by the dataset provider devices 310 or another data processing device communicably connected thereto.

Figure 2:
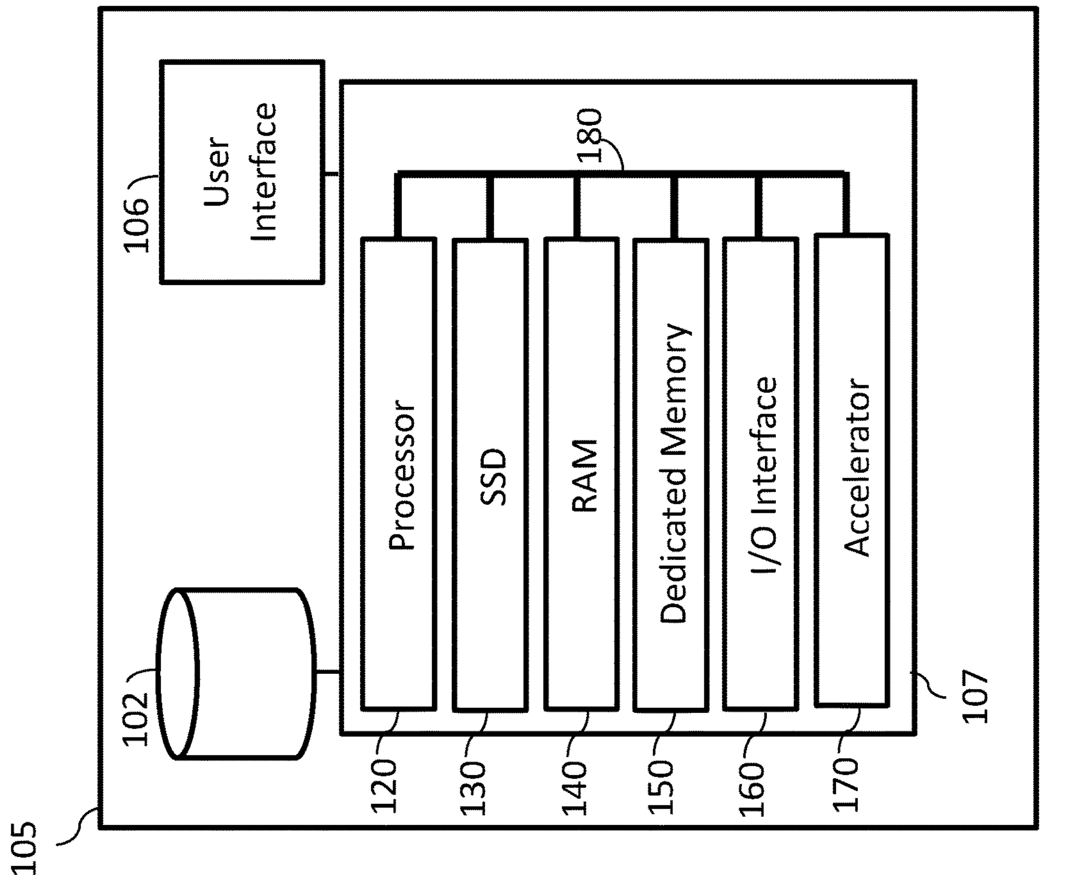
FIG. 2 is a schematic representation of an electronic device in accordance with an embodiment of the present technology.

With reference to FIG. 2, there is shown an electronic device 105 in accordance with non-limiting implementations of the present technology. The server 100, the model provider devices 210 and/or the dataset provider devices 310 may implemented as the electronic device 105. The electronic device 105 includes a computing unit 105. In some embodiments, the computing unit 105 may be implemented by any of a conventional personal computer, a controller, and/or an electronic device (e.g., a server, a controller unit, a control device, a monitoring device etc.) and/or any combination thereof appropriate to the relevant task at hand. In some embodiments, the computing unit 105 includes various hardware components including one or more single or multi-core processors collectively represented by a processor 120, a solid-state drive 130, a RAM 140, a dedicated memory 150 and an input/output interface 160. The computing unit 105 may be a generic computer system.

In some other embodiments, the computing unit 105 may be an "off the shelf" generic computer system. In some embodiments, the computing unit 105 may also be distributed amongst multiple systems. The computing unit 105 may also be specifically dedicated to the implementation of the present technology. As a person in the art of the present technology may appreciate, multiple variations as to how the computing unit 105 is implemented may be envisioned without departing from the scope of the present technology.

Communication between the various components of the computing unit 105 may be enabled by one or more internal and/or external buses 180 (e.g. a PCI bus, universal serial bus, IEEE 1394 "Firewire" bus, SCSI bus, Serial-ATA bus, ARINC bus, etc.), to which the various hardware components are electronically coupled.

The input/output interface 160 may provide networking capabilities such as wired or wireless access. As an example, the input/output interface 160 may include a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 130 stores program instructions suitable for being loaded into the RAM 140 and executed by the processor 120. Although illustrated as a solid-state drive 130, any type of memory may be used in place of the solid-state drive 130, such as a hard disk, optical disk, and/or removable storage media.

The processor 120 may be a general-purpose processor, such as a central processing unit (CPU) or a processor dedicated to a specific purpose, such as a digital signal processor (DSP). In some embodiments, the processor 120 may also rely on an accelerator 170 dedicated to certain given tasks. In some embodiments, the processor 120 or the accelerator 170 may be implemented as one or more field programmable gate arrays (FPGAs). Moreover, explicit use of the term "processor", should not be construed to refer exclusively to hardware capable of executing software, and may implicitly include, without limitation, application specific integrated circuit (ASIC), read-only memory (ROM) for storing software, RAM, and non-volatile storage. Other hardware, conventional and/or custom, may also be included.

Further, the electronic device 105 may include a Human-Machine Interface (HMI) 106. The HMI 106 may include a screen or a display capable of rendering an interface, an output of an MLM and/or an indication of an identification of a candidate MLM, metadata associated therewith, a target MLM, candidate and/or desired machine learning tasks, a ranking score of candidate MLMs, an unlabeled dataset, and/or any other information suitable for performing the methods described herein. In this embodiment, the display of the HMI 106 includes and/or be housed with a touchscreen to permit users to input data via some combination of virtual keyboards, icons, menus, or other Graphical User Interfaces (GUIs). The HMI 106 may thus be referred to as a user interface 106. In some embodiments, the display of the user interface 106 may be implemented using a Liquid Crystal Display (LCD) display or a Light Emitting Diode (LED) display, such as an Organic LED (OLED) display. The device may be, for example and without being limitative, a handheld computer, a personal digital assistant, a cellular phone, a network device, a smartphone, a navigation device, an e-mail device, a game console, or a combination of two or more of these data processing devices or other data processing devices. The user interface 106 may be embedded in the electronic device 105 as in the illustrated embodiment of FIG. 2 or located in an external physical location accessible to the user. For example, the user may communicate with the computing unit 105 (i.e. send instructions thereto and receive information therefrom) by using the user interface 106 wirelessly connected to the computing unit 105. The computing unit 105 may be communicate with the user interface 106 via a network (not shown) such as a Local Area Network (LAN) and/or a wireless connexion such as a Wireless Local Area Network (WLAN).

The electronic device 105 may include a memory 102 communicably connected to the computing unit 105 for storing outputs of the MLMs for example, and/or history of execution of the MLM. The memory 102 may be embedded in the electronic device 105 as in the illustrated embodiment of FIG. 2 or located in an external physical location. The computing unit 105 may be configured to access a content of the memory 102 via a network (not shown) such as a Local Area Network (LAN) and/or a wireless connexion such as a Wireless Local Area Network (WLAN).

The electronic device 105 may also include a power system (not depicted) for powering the various components. The power system may include a power management system, one or more power sources (e.g., battery, alternating current (AC)), a recharging system, a power failure detection circuit, a power converter or inverter and any other components associated with the generation, management and distribution of power in mobile or non-mobile devices.

It should be noted that the computing unit 105 may be implemented as a conventional computer server or cloud-based (or on-demand) environment. Needless to say, the computing unit 105 may be implemented in any other suitable hardware, software, and/or firmware, or a combination thereof. In the depicted non-limiting embodiments of the present technology in FIG. 2, the computing unit 105 is a single server. In alternative non-limiting embodiments of the present technology, the functionality of the computing unit 105 may be distributed and may be implemented via multiple servers.

Those skilled in the art will appreciate that processor 120 is generally representative of a processing capability that may be provided by, for example, a Central Processing Unit (CPU). In some embodiments, in place of or in addition to one or more conventional CPUs, one or more specialized processing cores may be provided. For example, one or more Graphic Processing Units (GPUs), Tensor Processing Units (TPUs), accelerated processors (or processing accelerators) and/or any other processing unit suitable for training and executing an MLM may be provided in addition to or in place of one or more CPUs. In this embodiment, the processor 120 of the computing unit 105 is a Graphical Processing Unit (GPU) and the dedicated memory 150 is a Video Random access Memory (VRAM) of the processing unit 120. In alternative embodiments, the dedicated memory 150 may be a Random Access Memory (RAM), a Video Random Access Memory (VRAM), a Window Random Access Memory (WRAM), a Multibank Dynamic Random Access Memory (MDRAM), a Double Data Rate (DDR) memory, a Graphics Double Data Rate (GDDR) memory, a High Bandwidth Memory (HBM), a Fast-Cycle Random-Access Memory (FCRAM) or any other suitable type of computer memory.

Figure 3:
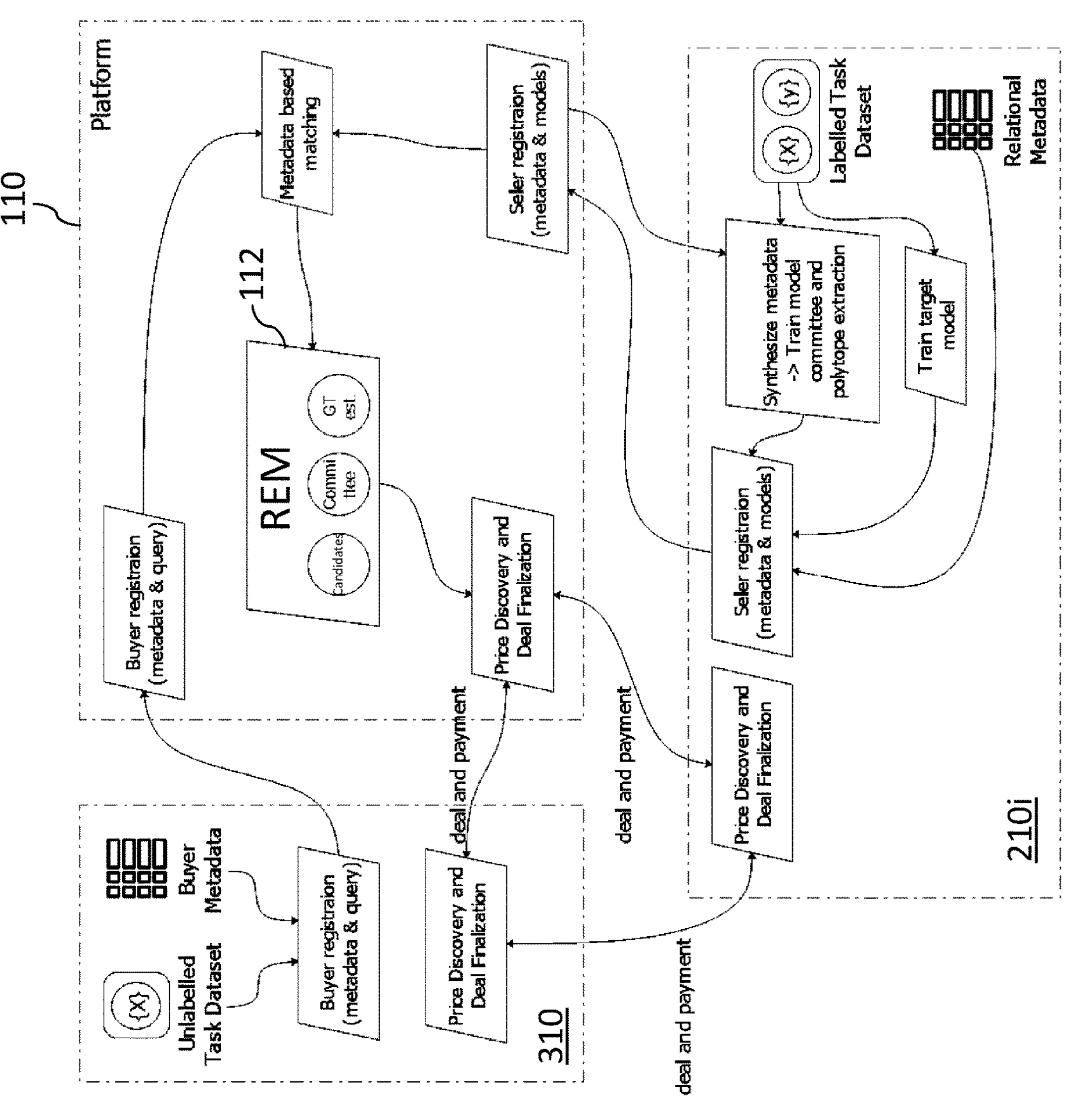
FIG. 3 is a schematic representation of functions performed within the MLM trading environment of FIG. 1.

FIG. 3 is a schematic representation of functions performed within the MLM trading environment 1000. More specifically, FIG. 3 describes a physical deployment of the MLM trading platform 110. In use, the model provider devices 210, the dataset provider device 310 and the server 100 are separate entities having their own software deployed in their own secure and physically separated environment. The model provider devices 210, the dataset provider device 310 and the server 100 exchange data when mandated by communication protocols administered by the aforementioned communication networks. It should also be noted that each model provider 200 is an entity distinct and independent from the other model providers 200. Data exchanged between the model provider devices 210, the dataset provider device 310 and the server 100 will now be described.

Figure 4:
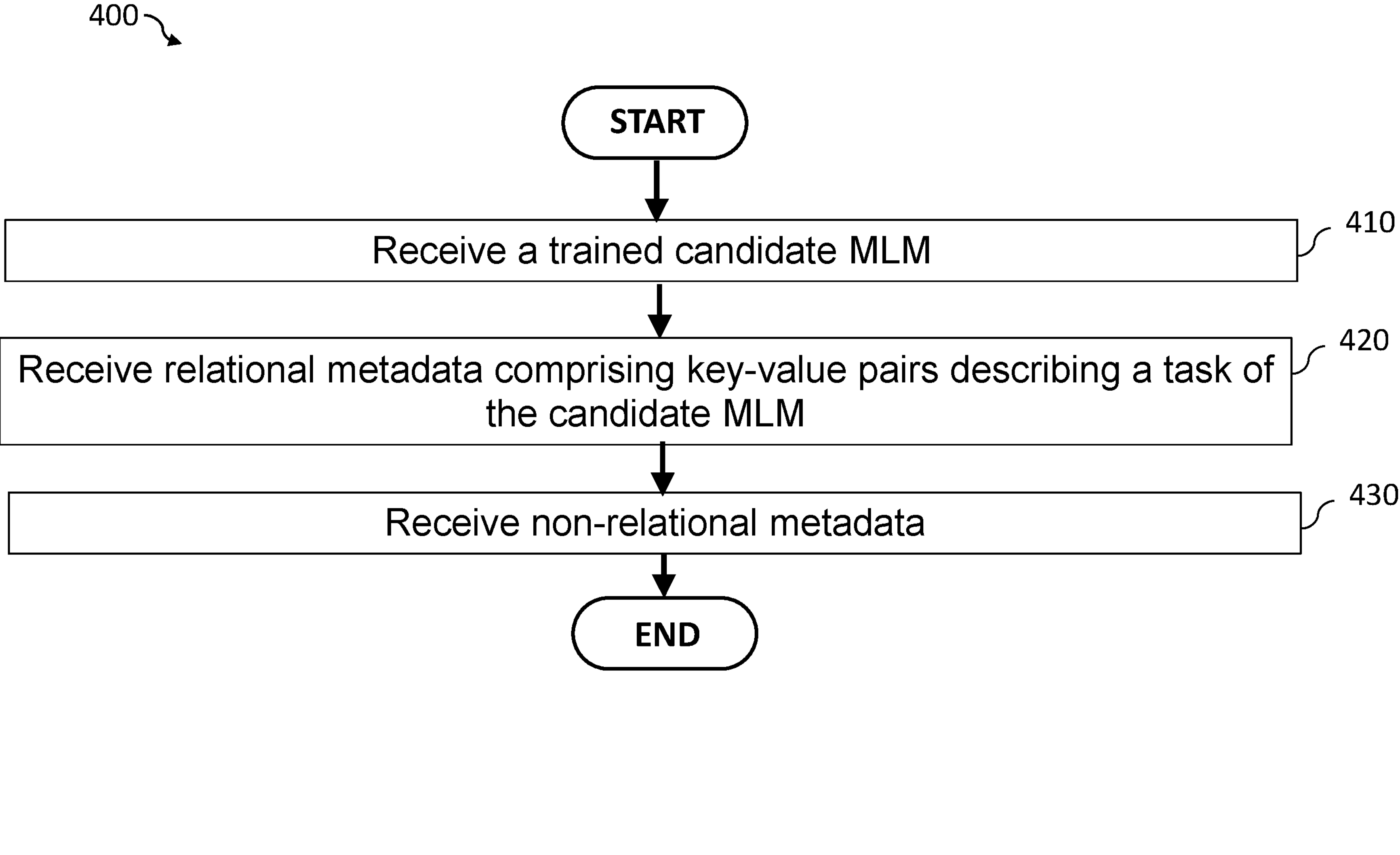
FIG. 4 is a flow diagram showing operations of a method for registering a model provider in the MLM environment of FIG. 1 in accordance with an embodiment of the present technology.

In use, the model providers 200 register, or "join" the MLM trading environment 1000 asynchronously to be able to offer their candidate MLMs to potential dataset providers 300 for purchase. In this implementation, a registration of a given model provider 200 is handled by the Seller registration submodule of the Client Registration Module. FIG. 4 is a flow diagram showing operations of a method 400 for registering a model provider onto the MLM trading platform 110 in accordance with an embodiment of the present technology. With both reference to FIGS. 3 and 4, the method 400 starts with training, at operation 410, MLMs and transmitting the trained MLMs as "candidate MLMs" 216 to the server 100. The training of the MLMs by the model providers 200 may be performed by using respective proprietary learning protocols, or any other model training protocol executed on the side of the model provider 200. For example, training of a given MLM of a given model provider 200 may be performed on the corresponding model provider device 210 before being transmitted to the server 100.

The method 400 continues with generating and transmitting, at operation 420, relational metadata 214 associated with a corresponding candidate MLM 216. The metadata are used to objectively and subjectively describe a candidate machine learning task pertaining to the candidate MLM 216. The relational metadata includes attributes such as definitions and descriptions of the candidate machine learning task, set of class-label names, class-label names to class-label identification mapping, evaluation metric, performance of the candidate MLM 216, sample training data and any other attributes suitable for describing the candidate MLM 216.

The method 400 continues with generating and transmitting, at operation 430, non-relational metadata 214 that helps in computing the usefulness of a corresponding candidate MLM 216 to a particular desired machine learning task of a dataset provider 300. Non-relational metadata 214 includes information such as a trained committee of models and decision boundaries (i.e. polytopes) extracted from the candidate MLM 216.

It should be noted that model providers may asynchronously register in the MLM trading platform 110 by executing operations of the method 400. In addition or optionally, the model providers 200 can log-in to the MLM trading platform 110 by registering and provisioning a log-in/password combination, by registering and provisioning user preferences and the like.

Figure 5:
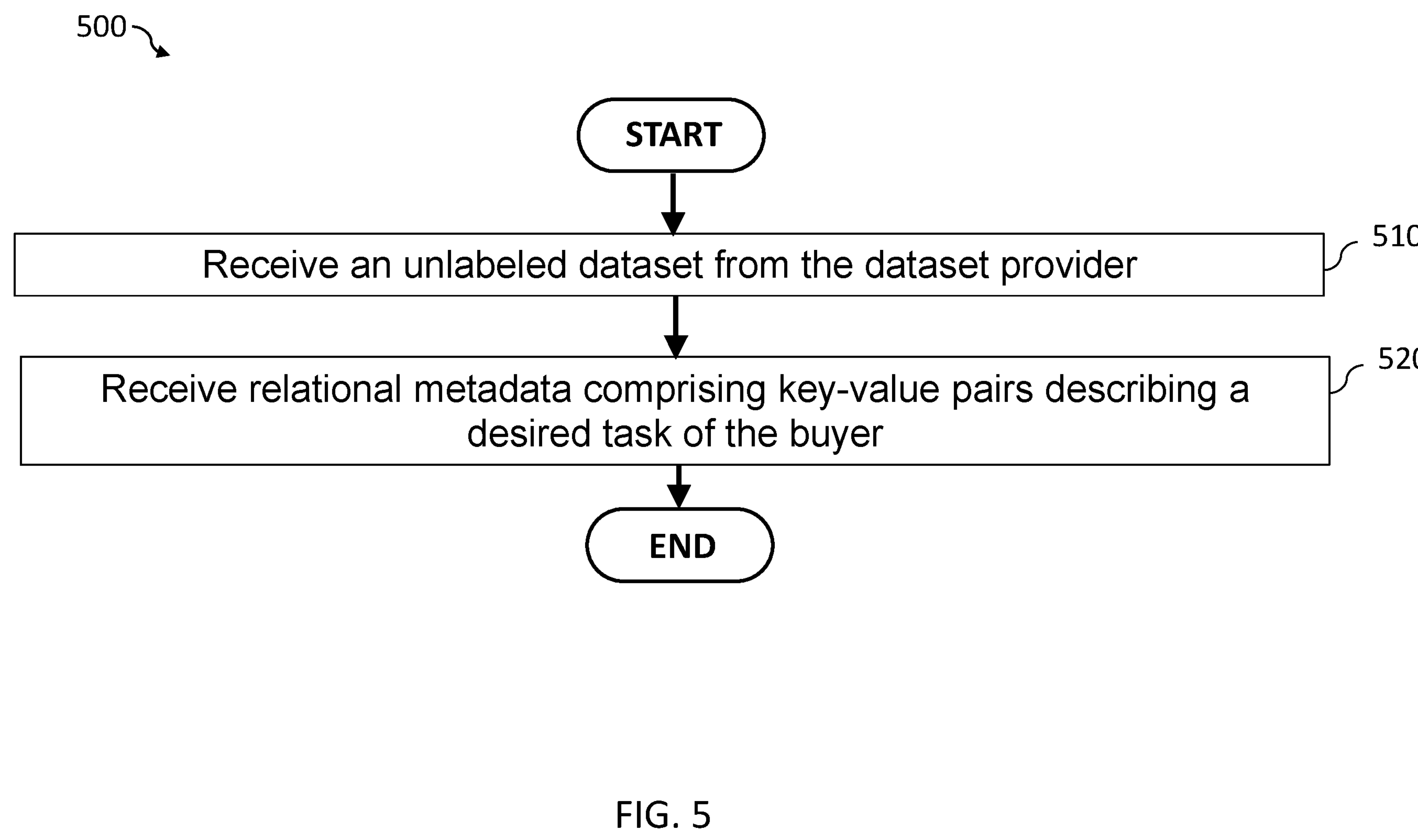
FIG. 5 is a flow diagram showing operations of a method for registering a dataset provider in the MLM environment of FIG. 1 in accordance with an embodiment of the present technology.

FIG. 5 is a flow diagram showing operations of a method for registering a dataset provider in the MLM trading platform 110 in accordance with an embodiment of the present technology. In further use, with both reference to FIGS. 3 and 5, the method 500 includes receiving by the server 100, at operation 510, using a Buyer registration submodule of a Client Registration Module, the unlabeled dataset 314 and indication of the desired machine learning task. The method 500 ends with receiving, at operation 520, relational metadata that includes quantitative and qualitative attributes describing the desired machine learning task.

FIG. 6 is a flow diagram showing operations of an implementation 530 of the method 500. In this illustrative example, a method 530 includes a registration of sellers (i.e. model providers 200) with executions of operations 540 to 560, and a registration of buyers (i.e. dataset providers 300) at operation 570. In this illustrative implementation, the sellers join the MLM trading environment 1000 asynchronously and generate and submit the following items to the server 100 in order to facilitate determination of a target MLM for a given buyer: one or more MLM trained with proprietary training algorithm at operation 540, relational metadata including key-value attributes describing the one or more trained MLM such as task description and definition, task type (image classification/object detection), image resolution, class names, class mapping, sample training dataset, hyperparameters or any other relational metadata at operation 550, and non-relational metadata including additional aggregate information about the trained MLM and the training dataset used by the seller at operation 560. In some implementation, the non-relational metadata include a committee of trained MLMs that were trained using pre-determined training protocols (e.g. specified by the MLM trading platform 110) and dataset bootstrapping, and polytopes (set of linear decision boundaries) that describe decision logics extracted with a random sample of the training dataset.

The method 530 continues with receiving, at operation 570, from the buyer and for registration thereof in the MLM trading environment 1000, relational metadata including key-value attributes describing the desired machine learning task, a task type, image resolution, class names, class mapping, and any other type of relational metadata, and the unlabeled dataset. It should be noted that registrations of the buyers and sellers may be made in parallel and are two independent processes.

Figure 7:
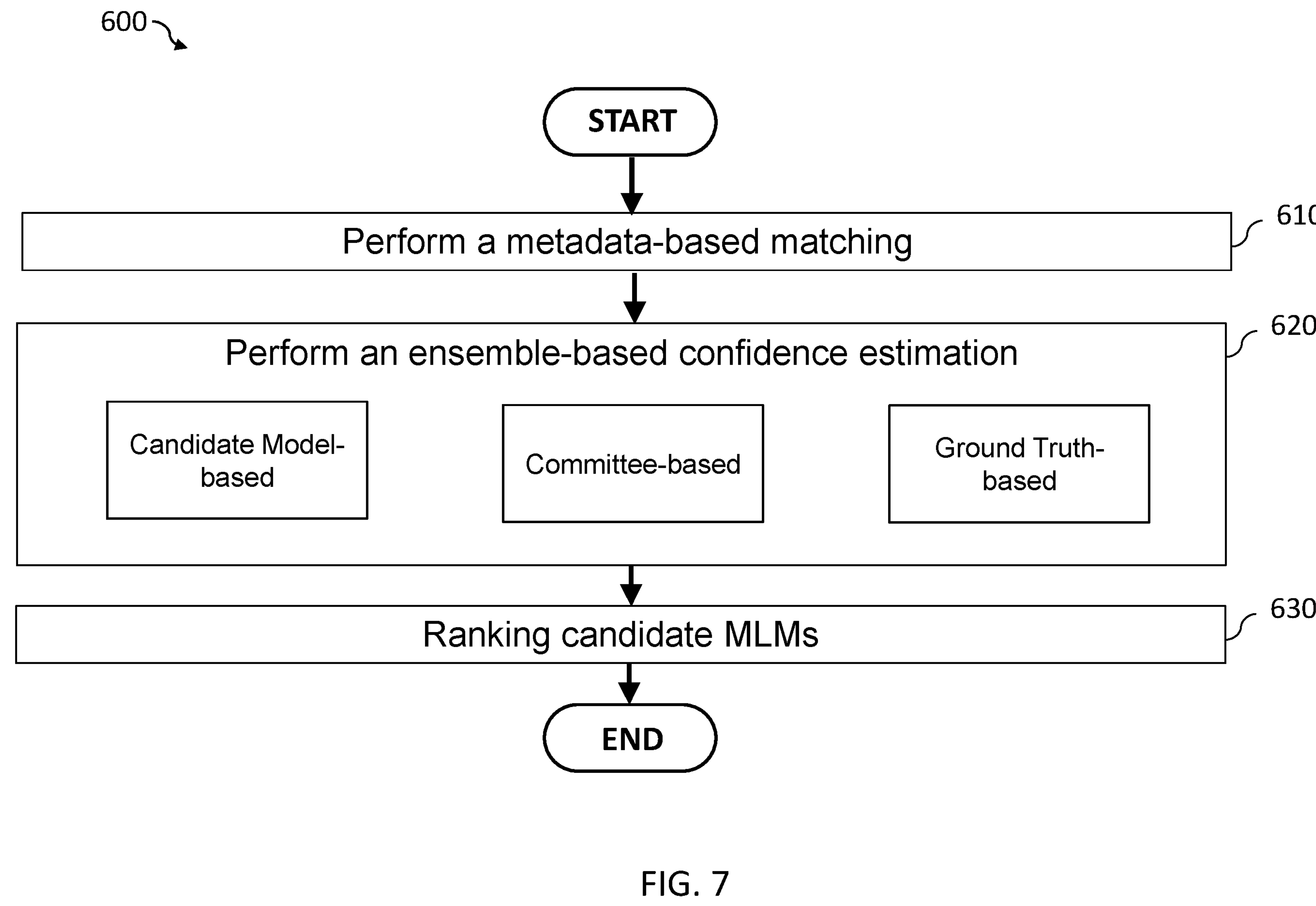
FIG. 7 is a flow diagram showing operations of a method for determining a target MLM for a dataset provider in accordance with an embodiment of the present technology.

FIG. 7 is a flow diagram showing operations of a method 600 for determining a target MLM for a dataset provider in accordance with an embodiment of the present technology. In this implementation, the method 600 includes performing, at operation 610, a metadata-based search to select a subset of potential target MLMs that match the desired machine learning task metadata 316. Said metadata-based selection may be performed by the server 100 by employing an off-the-shelf elastic-search. In other words, in response to a description of a given candidate MLM, as described by its corresponding metadata, matches a description of the desired machine learning task, as described by its corresponding metadata, the server 100 identifies the given candidate MLM as a potential target MLM.

During the metadata-based selection, potential target MLMs (and the corresponding model providers 200) are selected based on a structured/unstructured search of candidate MLM whose relational metadata match the metadata 314 of the desired machine learning task. A degree of matching may be determined by the server 100. This selection is performed using a combination of rule-based and off-the-shelf elastic search solution. For example, the metadata-based selection may include comparison of the following criteria: 1) solve a same desired machine learning task (e.g. cat vs dog image classification) 2) have the same or similar output class labels and mapping (cat: 0 and dog: 1, felinae: 0 and canidae: 1), 3) closest image resolution 4) highest reported accuracy of the candidate MLM.

Once a set of candidate MLMs is identified (e.g. using the aforementioned metadata matching-based identification), the method 600 continues with executing, at operation 620, the REM 112 to perform an ensemble-based confidence estimation to approximate usefulness of each candidate MLM for the desired machine learning task using the unlabeled dataset 314. More specifically, execution of the REM 112 may include performing, by the REM 112, (i) a candidate MLM-based estimation, (ii) a committee-based estimation, and/or (iii) a ground truth-based estimation. Outputs of one or more of said estimations may be combined to identify the target MLM 216T.

Candidate Mlm-Based Estimation

More specifically, the REM 112 performs a candidate MLM-based estimation to determine a usefulness score 217 for each candidate MLM 216A-216T for the unlabelled dataset 314 and the desired machine learning task. In this illustrative example (i.e. the desired machine learning task being image labeling), the usefulness score 217 a given candidate MLM is indicative of likelihood that the given candidate MLM generates accurate labels for the unlabeled dataset 314. The REM 112 may use standard off-the-shelf metrics for estimating the usefulness score. In use, the REM 112 determines, for each input object (e.g. image) x, a label-wise probability $P_\theta(\hat{y}_c|x)$ using a SoftMax function on final layer activations of the model θ. Here $\hat{y}_c$ is a probability of the $c^{th}$ label, among a total of C labels. The label-wise probability $P_\theta(\hat{y}_c|x)$ for the all the C labels form a label-wise probability vector. The REM 112 further determines, based on the class-wise probability vector:

a max score $\alpha_x = \max_c P_\theta(\hat{y}_c|x)$; and an average max score $$\frac{1}{|D_B|}\Sigma_{x\in D_B}\ \alpha_x,$$

where $D_B$ is the unlabeled dataset 314.

The usefulness score 217 of a given candidate MLM is, in this implementation, the average max score.

Additionally or optionally, the REM 112 further determines, based on the max scores and the entropy scores for each input object of the unlabeled dataset 314:

an entropy score $\beta_x = -\Sigma_c P_\theta(\hat{y}_c|x)\cdot\log P_\theta(\hat{y}_c|x)$; and an average entropy score $$\frac{1}{|D_B|}\Sigma_{x\in D_B}\ \beta_x,$$

where $D_B$ is the unlabeled dataset 314.

The usefulness score 217 of a given candidate MLM is, in this implementation, inversely proportional to the average entropy score. In some implementations, the average max scores of the candidate MLM are ranked and the candidate MLM having the highest average max score is identified, or "selected", as the target MLM 216T. In some other implementations, the average entropy scores of the candidate MLM are ranked and the candidate MLM having the lowest average entropy score is identified as the target MLM 216T.

Figure 8:
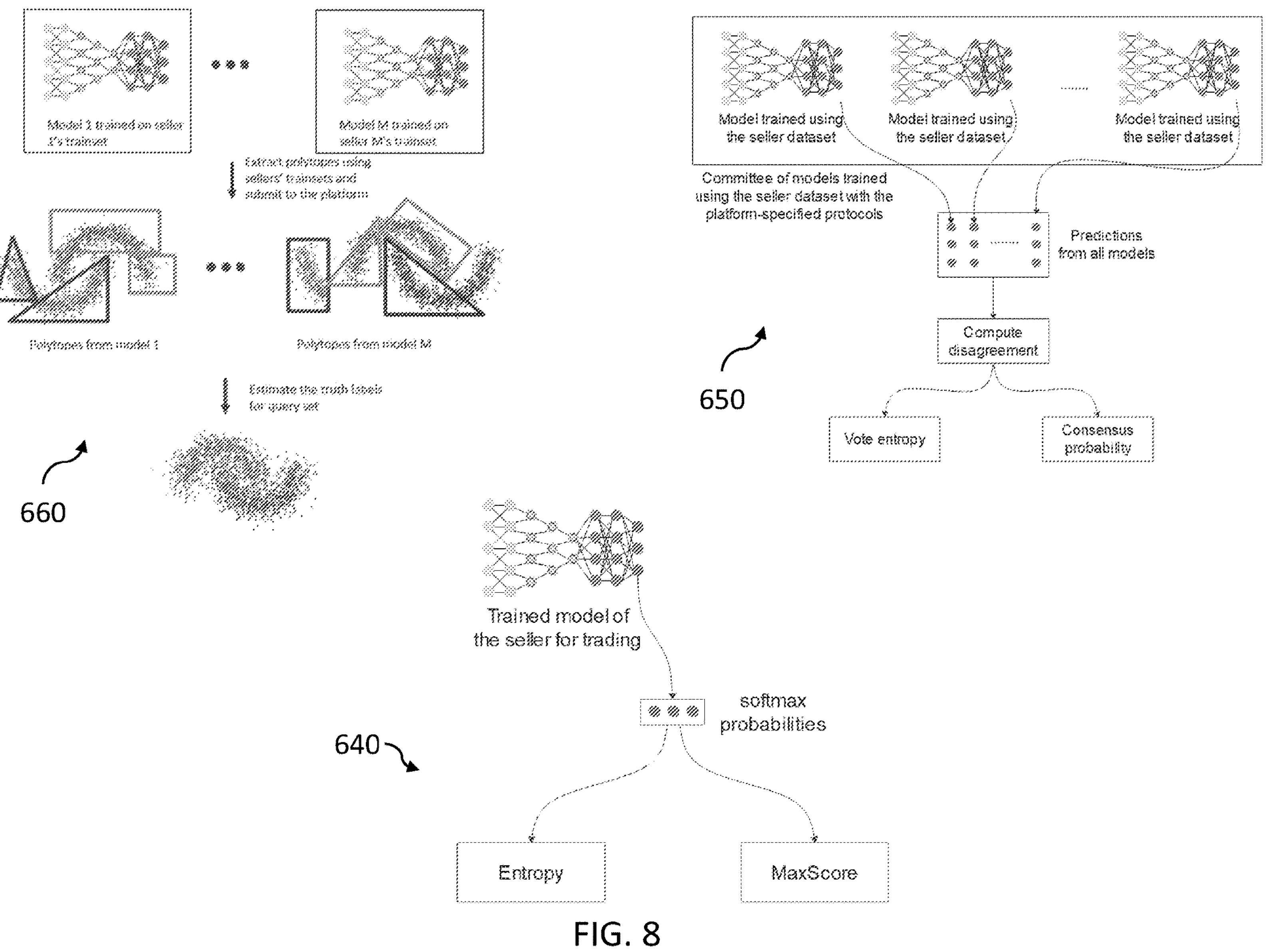
FIG. 8 includes schematic representations of a candidate MLM-based estimation pipeline, a committee-based estimation and a ground truth-based estimation pipeline to generate a usefulness score of a machine learning model.

With reference to FIG. 8, representation 640 illustrates generation of a candidate-based estimation, where an output of the candidate MLM (i.e. final layer thereof) for a given input object x is processed with a SoftMax function to determine one or both of the average max score or the average entropy score.

Committee-Based Estimation

The REM 112 performs a committee-based estimation by estimating a usefulness score 217 based on a committee, or "ensemble" of trained proxy MLM. In this implementation, each candidate MLM 216 is associated with a corresponding ensemble of MLM that may be included in the model provider data 212 transmitted to the server 100 by the corresponding model provider 200. The MLMs of a same ensemble of MLMs are trained using pre-determined specified protocols (e.g. that may be specified by an operator of the MLM trading platform 110). For example, the training of MLMs of a same ensemble of MLMs may include usage of overconfidence reduction techniques like bootstrapping. Usage of the ensemble of MLMs may facilitate mitigation of false positives by limiting an effect of overconfidence due to use of a single MLM. Broadly speaking, an advantage of the committee-based estimation is using MLM trading platform-specified training protocols and multiple MLMs to mitigate the effect of overconfidence due to usage of a single MLM trained with any protocols chosen by the corresponding model provider 200. In this implementation, the model provider 200 may receive from the server 100 and though the model provider device 210, MLM trading platform specified training protocols to train MLMs of a given ensemble of MLMs before transmitting the ensemble of MLMs to the server 100.

More specifically, in order to perform a committee-based estimation, the REM 112 uses multiple MLMs $$\theta_j^i$$

trained using MLM trading platform-specified training protocols from a given model provider $200_i$. The MLMs may form an ensemble $G_i$ of total M models for each model provider $200_i$. For example and without limitations, the MLMs of a same ensemble $G_i$ may be obtained using random initializations and bootstrapping of a corresponding training dataset.

The REM 112 further determines, for each input object $x \in D_B$, an agreement score among different MLMs of a same ensemble $G_i$ using the following metrics:

a vote entropy score is $$\alpha_x = -\Sigma_c \frac{V(y_c)}{M} \log \frac{V(y_c)}{M};$$

and an average vote entropy score is $$\frac{1}{|D_B|} \Sigma_{x \in D_B} \ \alpha_x.$$

Here, $V(y_c)$ represents the number of votes received for a given label on the input object x from the MLMs of the ensemble $G_i$. A vote for a given label corresponds to one of those MLM predicting that the input object x has the given label. The usefulness score 217 of a given candidate MLM is, in this implementation, inversely proportional to the average vote entropy score. Alternatively, a negative entropy may be used so that the usefulness score is proportional to it. In other words, the vote entropy score may be embodied as a negative entropy in alternative embodiments where $$\alpha_x = \Sigma_c \frac{V(y_c)}{M} \log \frac{V(y_c)}{M}.$$

Alternatively or optionally, the REM 112 may determine, for each input object $x \in D_B$, an agreement score among different MLMs of a same ensemble $G_i$ using the following metrics:

a consensus probability: $\beta_x = \max_c \Sigma_m P_{\theta_m}(\hat{y}_c | x)$; and an average consensus probability:

$$\frac{1}{|D_B|} \Sigma_{x \in D_B} \ \beta_x.$$

The usefulness score 217 of a given candidate MLM is, in this implementation, the average consensus probability.

The agreement score may be identified as the average vote entropy score or the average consensus probability. In some implementations, the MLM associated with the ensemble of MLMs with the highest average consensus probability is identified as the target MLM 216T. In some other implementations, the MLM associated with the ensemble of MLMs with the lowest average vote entropy score is identified as the target MLM 216T.

With reference to FIG. 8, representation 650 illustrates an ensemble, or "committee", of MLMs trained based on pre-determined training protocols, each MLM of the committee generates a prediction, or "output", for a same input object x, thereby forming a set of predictions. The server 100 further determine an agreement score for the ensemble of MLMs by comparing their respective predictions, and more specifically by determining one or both of the average vote entropy score and the average consensus probability.

Ground Truth-Based Estimation

The REM 112 performs a ground truth-based estimation by generating ground-truth labels for respective input objects from the unlabeled dataset 314 by employing a plurality of the candidate MLMs 216 from different model providers 200. To do so, the REM 112 uses, in this implementation, polytopes acquired from different candidate MLMs 216. Using polytopes may provide a reliable manner for ignoring candidate MLM that are expected to have a low usefulness score 217. The ground-truth-based estimation may thus help in mitigating the overconfidence problem. In other words, using polytopes acquired from different candidate MLMs limits votes of the MLM for input object that are located inside a training distribution thereof, thereby mitigating the overconfidence issue. For example, an input object may be outside of a training distribution of a given MLM, while having a relatively high usefulness score (e.g. average max score), which may lead to an overconfidence issue for that MLM. Using the polytopes of the candidate MLMs thus mitigate this effect.

In use, the server 100 receives polytopes from the model providers 200 for each candidate MLM 216. The polytopes may be for example included in the associated metadata 214 (see FIG. 1). An example of a pseudo-code for extracting polytope metadata is shown below:

---

Input: A trained model M and a sample of training points D

Output: Polytope meta-data $\mathbb{P} = \{P_1, \ldots, P_N\}$, where N is the number of polytopes.

▷ Extract Polytope meta-information $\mathbb{P}$ from a trained model M and a sample of training points D 1. Replace the ground truth label y in trainset D with model's predicted label $\hat{y}$. Denote by $\breve{D}$ the generated dataset. ▷ Because we only care for the model's decision logic.

-continued

```
2.    Obtain candidate boundaries {h_1, ..., h_L} from model M and D.
        1. Randomly sample 50 training points in each class. Obtain a subset D_s.
        2. Calculate the decision boundaries between all possible pair of points in D̂_s with
           different class labels.
        3. Visit all possible pairs of points in D̂. If any pair of points cannot be split by existing
           boundaries. Calculate the decision boundary between these two points and add into
           the candidate boundaries.
3.    Define Function fit_tree (Current dataset D_now):
 |    if D_now is pure then
 |      | Create a leaf node and return
 |    end
 |    l = argmax_{l∈(,...,L)} Gain(l) ; Here, Guin(l) is the information gain of
 |       boundary h_l.
 |    left sub-tree ← fit_tree(D_now ∩ {x : h_l(x) > 0});
 |    right sub-tree ← fit_tree(D_now ∩ {x : h_l(x) < 0});
 |    Create a tree node and connects the left and right sub-tree;
 |    return the whole tree;
4.    tree ← fit_tree(Ď). Obtain polytopes {P_1, ..., P_N} from the tree's leaves.
5.    Post-process: For each polytope P_n ∈ {P_1, ..., P_N}, if there exists boundaries in
(h_1, ..., h_L} such that P_n's volume shrinks while containing the same training points,
then add these boundaries into P_n.
```

In this implementation, the REM 112 further generates estimated ground truth labels for each input object of the unlabeled dataset 314 using the polytopes received from the model providers 200. The REM 112 first generates a usefulness score for each model provider 200 using polytopes of corresponding candidate MLMs. In an implementation, the usefulness indicator is either 1 or 0 determined by whether the sample is covered by this model provider's decision logic, i.e. falling inside the polytope boundaries. If the sample is falling outside, the usefulness score, the REM 112 does not take into consideration the model provider 200 to determine the estimated ground truth labels. More specifically, a query-point is defined based on the desired machine learning task by the server 100 using known techniques for generation query-based point in a space of a polytope. The query-based point may be generated using techniques described in "Finding Representative Interpretations on Convolutional Neural Networks", by Peter Cho-Ho Lam, Lingyang Chu, Maxim Torgonskiy, Jian Pei, Yong Zhang and Lanjun Wang, and published in 2021, the content of which incorporated by reference in its entirety herein, or in "Exact and Consistent Interpretation of Piecewise Linear Models Hidden behind APIs: A Closed Form Solution" by Zicun Cong, Lingyang Chu, Lanjun Wang, Xia Hu, Jian Pei, published in 2020, the content of which incorporated by reference in its entirety herein.

In response to the query-point falls outside a range of the polytope of a candidate MLM, the candidate MLM is not taken into consideration to determine the estimated ground truth labels of the unlabeled dataset 314. This allows REM 112 to ignore model providers whose models are not useful on predicting accurate labels for the unlabelled dataset of the dataset provider.

The REM 112 further generates the ground-truth labels based on considered candidate MLMs. More specifically, the REM 112 may execute the considered candidate MLMs onto the unlabeled dataset 314, collect outputs thereof and aggregate the label distributions to generate the estimated ground truth labels, each input object of the unlabeled dataset 314 being associated with an estimated ground truth label.

The REM 112 may further estimate an accuracy of each candidate MLM based on the generated estimated ground truth labels. More specifically, the output of a given candidate MLM is compared to the generated estimated ground truth label to generate a ground truth-based usefulness score of the candidate MLM. For example, average distance between the outputs of the candidate MLM and the estimated ground truth labels for each input object of the unlabeled dataset 314 may be determined to generate the ground truth-based usefulness score. The candidate MLM with the highest ground truth-based usefulness score may be identified as the target MLM 216T by the REM 112. The usefulness score 217 of a given candidate MLM is, in this implementation, the ground truth-based usefulness score.

Broadly speaking, the use of the ground truth-based estimation to identify the target MLM 216T leverages the extracted polytopes to detect out-of-distribution (OOD) query point and thus mitigate overconfidence phenomena. A given MLM and outputs thereof are not considered in response to the query point (defined in the desired machine learning task) is falling outside its polytopes.

With reference to FIG. 8, representation 660 illustrates a plurality of candidate MLMs corresponding to a plurality of model providers 200, from which polytopes are extracted, each MLM having been executed with a same input object x. The polytopes are further used to generate the estimated ground truth labels to which an output of a given candidate MLM may be compared.

In some implementations, a usefulness score of a given candidate MLM is based on a combination of at least two of the average max score, the average entropy score, the average vote entropy score, the average consensus probability and the ground truth-based usefulness score. For example, the usefulness score 217 may be a weighted average of the average max score and the average consensus probability. As another example, the usefulness score 217 may be a median of average max score and an inverse of the average vote entropy score.

The method 600 ends with ranking, at operation 630, the candidate MLMs according to their respective usefulness scores. The server 100 may provide, to the dataset provider 300 and through the dataset provider device 310, an indication of the top K candidate MLM, where K is a predetermined value. In this implementation, the candidate MLM having the highest usefulness score is identified as the target MLM 216T. The dataset provider 300 may provide indication of a selected candidate MLM that the dataset provider 300 desire to use, purchase or obtain. In the context of the present disclosure, it is assumed that the selected candidate MLM and the target MLM 216T are a same MLM.

It should be understood that the dataset provider 300 may select a different MLM for performing the desired machine learning task in alternative use case scenario.

Finally, subsequent to execution of the REM 112, the server 100 may execute a Price Discovery and Deal Finalization Module (see FIG. 3) to coordinate with the model provider 200 of the target MLM 216T and the dataset provider 300 to finalize a trade of the target MLM 216T. An overview of the execution of the modules of the Price Discovery and Deal Finalization Module is described below.

Figure 9:
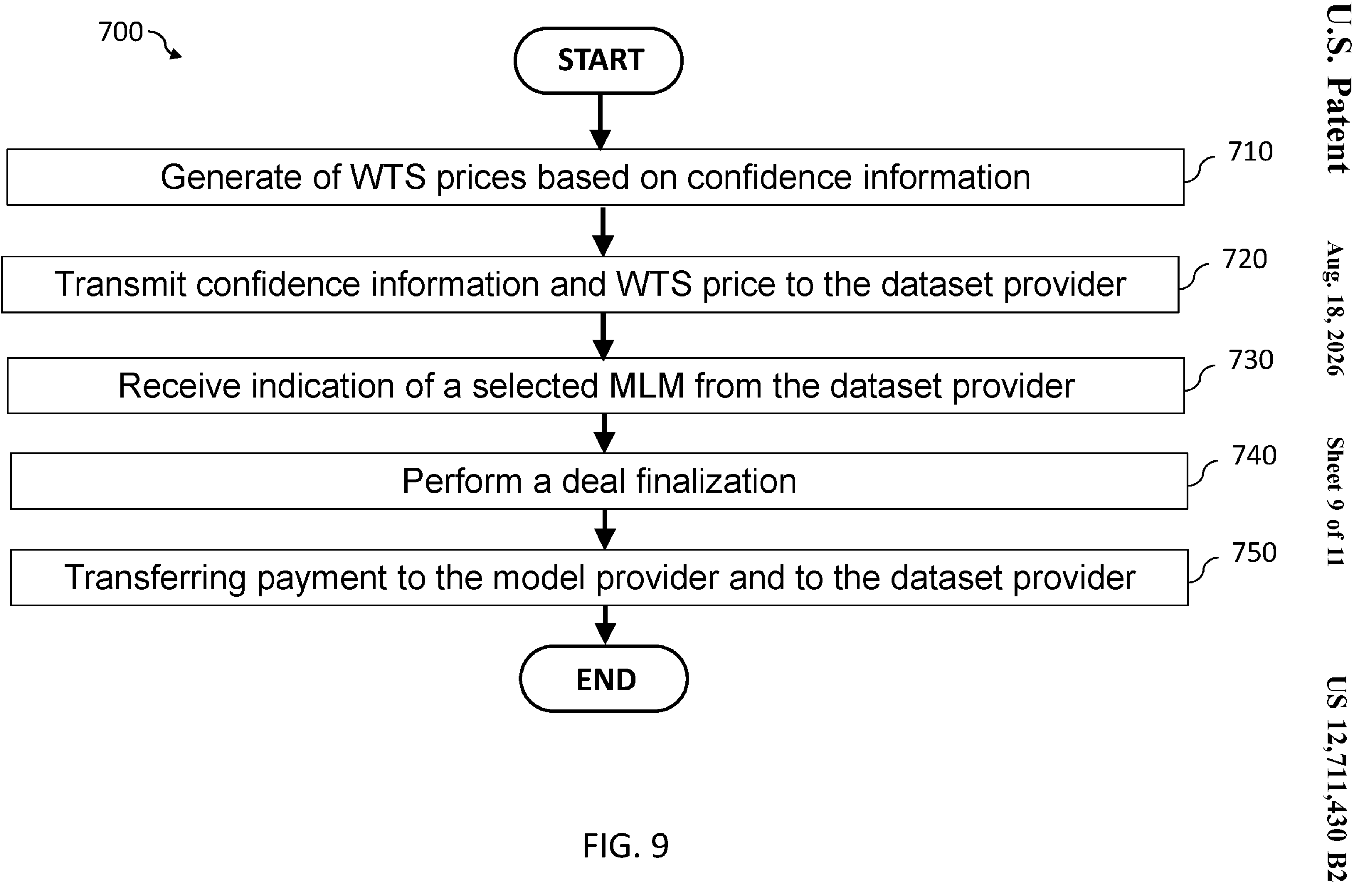
FIG. 9 is a flow diagram showing operations of a method for performing a monetary exchange between a dataset provider and a model provider in accordance with an embodiment of the present technology.

FIG. 9 is a flow diagram showing operations of a method 700 for performing a monetary exchange between a dataset provider and a model provider in accordance with an embodiment of the present technology.

The method 700 begins with generating, at operation 710, a Willing To Sell (WTS) price for each candidate MLM based on their respective usefulness score. For example, the WTS price of a candidate MLM with a usefulness score 217 having a first value may be set higher than a WTS price of another candidate MLM with a usefulness score 217 having a second value lower than the first value. For example and without limitations, the WTS prices of the candidate MLMs may be proportional to the usefulness scores thereof. The generated WTS prices may be transmitted to the corresponding model providers 200 for approval and/or modification thereof. In some implementations, the WTS price of each candidate MLM set by the corresponding model provider 200 and received by the server 100 at operation 710.

The method 700 continues with transmitting, at operation 720, indications of the WTS prices of the candidate MLMs (e.g. the top K candidate MLMs) along with the corresponding usefulness scores to the dataset provider such that the dataset provider 300 may transmit indication of a selected candidate MLM (e.g. the target MLM 216T) at operation 730. The dataset provider 300 may thus choose the selected MLM based on the corresponding WTS price and the usefulness scores.

The method 700 continues with performing, at operation 740, a deal finalization to facilitate any optional negotiations and finally seals the transaction and initiate the deal finalization protocols.

The method 700 ends with transferring payment, at operation 750, between the model provider 200 of the selected MLM and the dataset provider 300. More specifically, the server 100 may receive payment from the dataset provider 300, transfers the selected MLM to the dataset provider 300, transmit the payment or a percentage (e.g. by performing a commission-based remuneration) thereof to the model provider 200 corresponding to the selected MLM.

In some implementations, the server 100 further causes execution of the selected MLM using the unlabeled dataset 314. For example, the server 100 may transmit the selected MLM and the unlabeled dataset 314 to another computing device (e.g. a resource server communicably connected to the server 100 or the dataset provider device 310) to cause execution of the selected MLM. Alternatively, the server 100 may locally execute the selected MLM. An output of the execution of the selected MLM may further be transmitted to the dataset provider device 310 by the server 100. In this implementation, server 100 causes generation of the labels for the unlabeled dataset 134 by locally executing the selected MLM. In some implementations, said labels are classes to classify input objects included in the unlabeled dataset 314.

Summarily, a use case scenario of the MLM trading environment 1000 is as follows. The dataset provider desire to obtain, purchase or use (e.g. by leasing) a MLM for performing a given desired machine learning task using an unlabeled dataset. Multiple model providers offer candidate MLMs for purchase. The dataset provider aims to buy a MLM which can best predict the class labels of the unlabeled dataset. The dataset provider uploads the unlabeled dataset to a server operating a MLM trading platform. On the other side, the model providers upload their candidate MLMs, along with relevant metadata about the candidate MLMs. The MLM trading platform estimates the expected usefulness $U(D_B, f_i)$, or "confidence" in performing the desired machine learning task with accuracy and reliability, of a given candidate MLM $f_i$ with respect to the unlabeled dataset of the buyer $D_B$. The usefulness information may be shared to the model providers and the dataset provider. The dataset provider may select a given MLM to be bought based on the usefulness information of the candidate MLMs. Payment is transferred to the model provider corresponding to the selected MLM and the selected MLM is transferred to the dataset provider.

Figure 10:
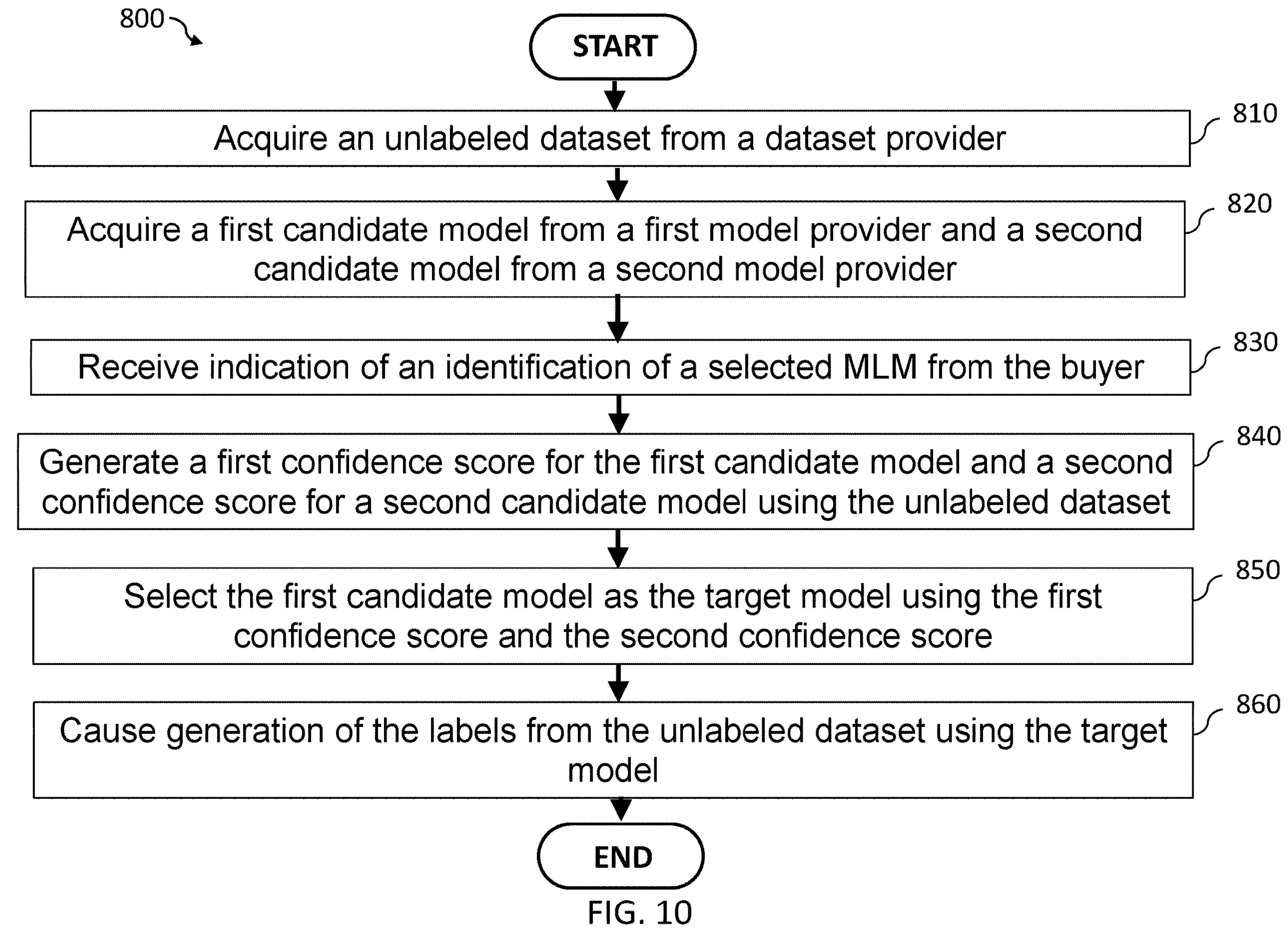
FIG. 10 is a flow diagram showing operations of a method for selecting a target model for an unlabeled dataset of a dataset provider, the target model for generating labels for the unlabeled dataset in accordance with an embodiment of the present technology.

FIG. 10 is a flow diagram of a method 800 for selecting a target MLM for the unlabeled dataset 314 of the dataset provider 300, the target MLM for generating labels for the unlabeled dataset 314, according to some embodiments of the present technology. In one or more aspects, the method 800 or one or more steps thereof may be performed by a processor or a computer system, such as the computing unit of the server 100. The method 800 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

The method 800 includes acquiring, by the server 100 at operation 810, the unlabeled dataset 314 from the dataset provider 300.

The method 800 further includes acquiring, by the server 100 at operation 820, a first candidate MLM 216A from a first model provider 200A and a second candidate MLM 216B from a second model provider 200B, the first model provider 200A and the second model provider 200B being communicatively coupled to the server 100. In some implementations, more than two MLMs could be acquired without departing from the scope of the present technology. In an implementation, the first candidate MLM 216A has been trained based on first training data available to the first model provider 200A and the second candidate MLM 216B has been trained based on second training data available to the second model provider 200B using, for example and without limitations, their respective proprietary protocols for training MLMs.

In some implementation, the method 800 further includes performing a metadata-based selection to identify a subset of potential target MLMs including the first and second candidate models. More specifically, potential target MLMs may be identified based on a degree of matching determined using a structured/unstructured search of candidate MLM whose relational metadata match the metadata 314 of the desired machine learning task submitted by the dataset provider 300.

The method 800 further includes generating, by the server 100 at operation 830, a first usefulness score 217A for the first candidate MLM 216A and a second usefulness score 217B for the second candidate MLM 216B using the unlabeled dataset 314. In this implementation, the first usefulness score 217A is indicative of likelihood that the first candidate MLM 216A generates accurate labels for the unlabeled dataset 314 and the second usefulness score is indicative of likelihood that the second candidate MLM 216B will generate the accurate labels for the unlabeled dataset 314.

In order to generate the first usefulness score 217A, the server 100 generates, some implementations, label-wise probabilities for respective input objects from the unlabeled dataset by employing the first candidate MLM 216A. The server 100 further generates scores for respective input objects of the unlabeled dataset 314 based on the respective label-wise probabilities. More specifically, the scores are indicative of how confident the first candidate MLM 216A is in a given label amongst a plurality of potential labels for the respective input objects. The server 100 further generates the first usefulness score 217A based on a combination of the scores for respective input objects. In some implementations, said labels are classes to classify input objects included in the unlabeled dataset 314.

In scenarios where the server 100 perform a candidate MLM-based estimation to generate the scores, the scores may be max scores for respective input objects and the combination of scores is an average max score for the input objects. In this example:

a given max score is $\alpha_x = \max_c P_\theta(\hat{y}_c|x)$; and the average max score is $$\frac{1}{|D_B|}\Sigma_{x\in D_B}\ \alpha_x.$$

where x is an input object; $\hat{y}_c$ is a probability of the $c^{th}$ label, among C labels; $P_\theta(\hat{y}_c|x)$ is a label-wise probability determined using a SoftMax function on final layer activations of a proposed model $\theta$; and $D_B$ is the unlabeled dataset. The usefulness score 217 of a given candidate MLM is, in this implementation, the average max score.

Alternatively or optionally, the scores may be entropy scores for respective input objects and the combination of scores is an average entropy score for the input objects. In this example:

a given entropy score is $\beta_x = -\Sigma_c P_\theta(\hat{y}_c|x)\cdot\log P_\theta(\hat{y}_c|x)$ the average entropy score is $$\frac{1}{|D_B|}\Sigma_{x\in D_B}\ \beta_x,$$

where x is an input object; $\hat{y}_c$ is a probability of the $c^{th}$ label, among C labels; $P_\theta(\hat{y}_c|x)$ is a label-wise probability determined using a SoftMax function on final layer activations of a proposed model $\theta$; and $D_B$ is the unlabeled dataset. The usefulness score 217 of a given candidate MLM is, in this implementation, the average entropy score.

In scenarios where the server 100 perform a committee-based estimation to generate the scores, the server 100 receives an ensemble of models trained by the first model provider based on the first training data and pre-determined protocols. The server 100 further generates agreement scores for respective input objects based on the ensemble of models. More specifically, the agreement scores are indicative of similarity of predictions made by the ensemble of models for the respective input objects. The server 100 further generates, the first usefulness score 217A based on a combination of the agreement scores for respective input objects.

In some implementations, the agreement scores are vote entropy scores for respective input objects and the combination of agreement scores is an average vote entropy score for the input objects, where:

a given vote entropy score is $$\alpha_x = -\Sigma_c \frac{V(y_c)}{M}\log\frac{V(y_c)}{M};$$

and the average vote entropy score is $$\frac{1}{|D_B|}\Sigma_{x\in D_B}\ \alpha_x,$$

and where M is a number of models in the ensemble of models; x is an input object; $V(y_c)$ is the votes received by class c; $\hat{y}_c$ is a probability of the $c^{th}$ label, among C labels; and $D_B$ is the unlabeled dataset. The usefulness score 217 of a given candidate MLM is, in this implementation, the average vote entropy score.

Alternatively or optionally, the agreement scores may be consensus probability scores for respective input objects and the combination of agreement scores is an average consensus probability for the input objects where:

a given consensus probability score is $$\beta_x = \max_c \frac{1}{M}\Sigma_{m\in|M|}\ P_{\theta_m}\ (\hat{y}_c\,|\,x)$$

the average consensus probability score is $$\frac{1}{|D_B|}\Sigma_{x\in D_B}\ \beta_x,$$

and where $y_c$ is a probability of the $c^{th}$ label, among C labels; $P_{\theta_m}(\hat{y}_c|x)$ is a label-wise probability determined using a SoftMax function on final layer activations of a proposed model $\theta$; M is a number of models in the ensemble of models; and $D_B$ is the unlabeled dataset. The usefulness score 217 of a given candidate MLM is, in this implementation, the average consensus probability score.

In scenarios where the server 100 performs a ground truth-based estimation to generate the scores, the server 100 generates ground-truth labels for respective input objects from the unlabeled dataset using polytopes acquired from the first model provider and the second model provider in order to generate the first usefulness score 217A. The server 100 further generates by employing the generated ground-truth labels, predicted labels for respective input objects from the unlabeled dataset. The server 100 further generates the first usefulness score 217A based on a comparison of the predicted labels and the ground-truth labels for respective input objects.

For example, in a scenario where four candidate MLMs are available for an input object, the input object being an image of an animal, the server 100 may use an output of a first MLM is the input object falls within the polytope of the first MLM. In this example, the first MLM outputs the predicted label “dog”. A second MLM of the four MLM outputs “cat”. The input object falls outside of the polytope of a third MLM, a vote of the third MLM is thus ignored. A fourth MLM outputs the predicted label "dog". The estimated ground truth label of the input object is thus "dog", by selecting the predicted label having the highest number of votes. The ground-truth label may further be transmitted to the user in response to the desired machine learning task. Once a ground-truth label for the input object has been determined, the usefulness score for a given candidate MLM may be determined by comparing the ground-truth label and the predicted labels of said candidate MLM.

In some implementations, the first usefulness score 217A is based on a combination of at least two of the average max score, the average entropy score, the average vote entropy score, the average consensus probability and the ground truth-based usefulness score. For example, the first usefulness score 217A may be a weighted average of the average max score and the average consensus probability. As another example, the first usefulness score 217A may be a median of average max score and an inverse of the average vote entropy score.

The method 800 further includes selecting, by the server 100 at operation 840, the first candidate MLM 216A as the target model using the first usefulness score 217A and the second usefulness score.

The method 800 further includes causing, by the server 100 at operation 850, generation of the labels from the unlabeled dataset using the target model. For example, the server 100 may transmit the target MLM and the unlabeled dataset 314 to another computing device (e.g. a resource server communicably connected to the server 100 or the dataset provider device 310) to cause execution of the target MLM. Alternatively, the server 100 may locally execute the target MLM. An output of the execution of the target MLM may further be transmitted to the dataset provider device 310 by the server 100. In some implementations, the labels may be indicative of at least one of an object detection task, an object localization task and an object classification task executed on the unlabeled dataset 314.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

Figure 11:
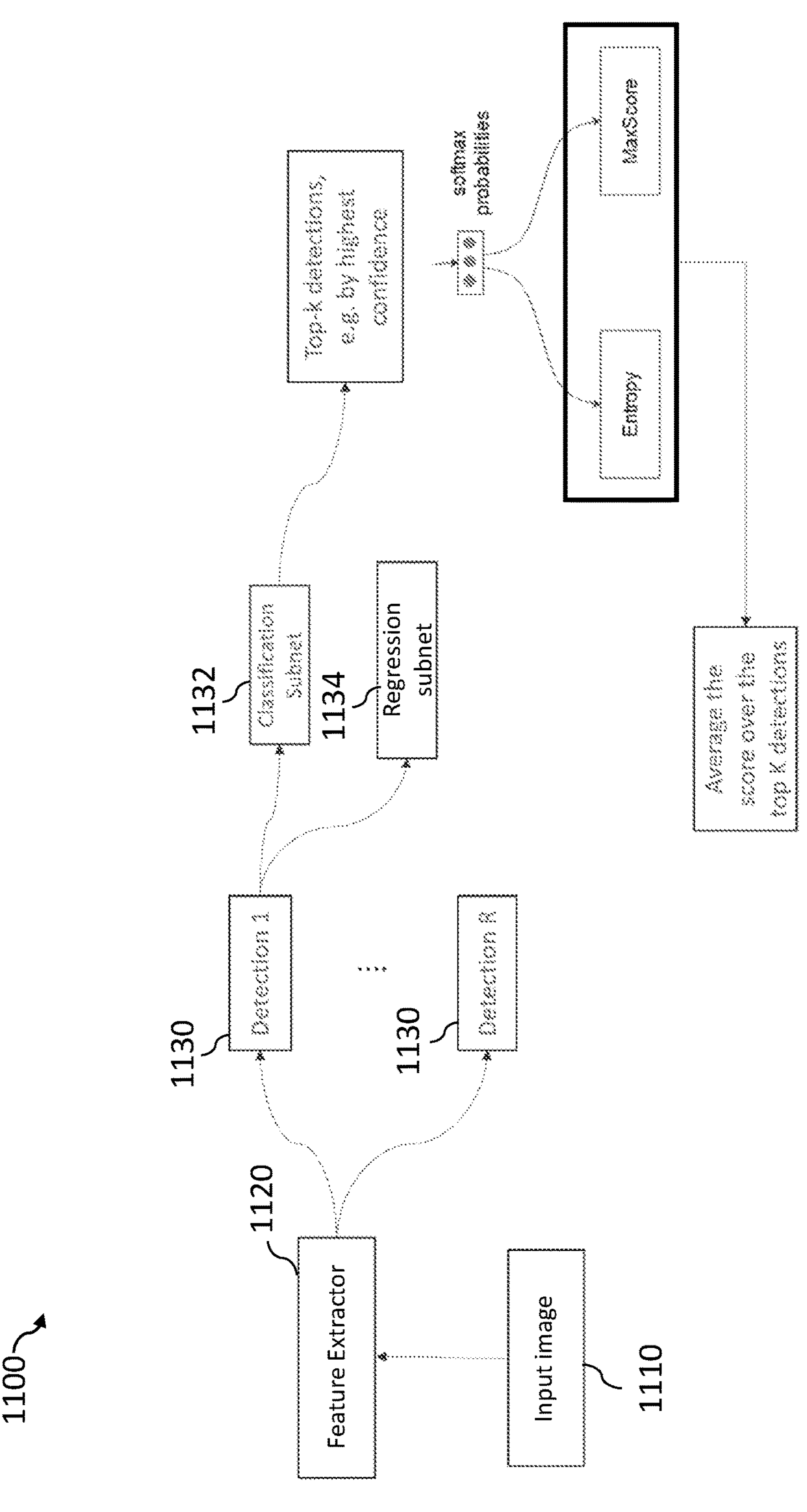
FIG. 11 is a schematic representation of a pipeline for generating a usefulness score for an object detection application in accordance with an embodiment of the present technology.

FIG. 11 is schematic representation of a pipeline 1100 for generating a usefulness score for an object detection application in accordance with an embodiment of the present technology. Teachings of the present disclosure may also be applied to object detection applications. More specifically, the desired machine learning task of the dataset provider 300 is an object detection task rather than an image classification task. In this illustrative example, the candidate MLMs of the model providers 200 are trained to perform object detection tasks rather than image classification tasks. The pipeline 1100 for determining a target MLM for a given desired machine learning task is executed by the server 100.

An input object 1110, which is, in this implementation, an input image, is processed by a feature extractor 1120 (e.g. ResNet+Feature Pyramid Network pipeline) executed by the server 100 to output one or more candidate detections 1130. In this implementation, the feature extractor 1120 is combined with an object detection module such as RetinaNet or YoloV5 to generate the candidate detections 1130. Upon generating the candidate detections 1130, for each candidate detection 1130, a corresponding classification subnet and a regression subnet is executed. For example, the candidate detection 1130 denoted "Detection 1" in FIG. 11 is associated with classification subnet 1132. More specifically, the classification subnet of a given candidate detection 1130 is indicative of a class-wise probability of activation of classes among a total number of C pre-determined classes. In this implementation, the classification subnets output logits corresponding to the activation of each of the C classes. For example, the classification subnet 1132 may be indicative of a first class-wise probability relative to Detection 1 belonging to a class C1 (e.g. the first class-wise probability is 0.7) and a second class-wise probability relative to Detection 1 belonging to a class C2 (e.g. the second class-wise probability is 0.9). The regression subnet is indicative of predicted coordinates of a detection bounding box for the corresponding candidate detection 1130 on the input image 1110. In this implementation, the output of the regression subnet 1134 is discarded. Alternatively, in some other implementations, the output of the regression subnet 1134 may be used to improve the accuracy of the usefulness score by enabling the server 100 to ignore duplicate detections via NMS suppression.

In this implementation, the server 100 uses the classification subnets of the candidate detections 1130 to filter top-K candidate detections 1130 based on the class-wise probability of the predicted bounding box. K may be a hyperparameter specified by a provider of the input image (e.g. a dataset provider 300, or "buyer"). For example, K may be set between 5 and 10. More specifically, the server 100 converts the logits into SoftMax probabilities and identify a highest probability as the class-wise probability of the detection bounding box. The server 100 may further determine a usefulness score (e.g. the aforementioned max score or entropy) for each top-K candidate detection 1130. Finally, the server 100 averages the usefulness scores over the top-K candidate detections 1130 to obtain an image usefulness score of the pipeline 1100 for the given input image 1110. Different pipelines may thus be submitted by the model providers 200 and further compared as previously described with respect to the candidate MLMs. For example, instead of selecting the top-K candidate detections 1130 based on average confidence, the top-K candidate detections 1130 may be selected based on another metric such as the max score metric, and further averaged using one or more combined metrics to obtain the image confidence score of the pipeline 1100 for the given input image 1110. A target pipeline may also be determined similarly to the determination of a target MLM described here above.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of selecting a target model for an unlabeled dataset of a dataset provider, the target model for generating labels for the unlabeled dataset, the dataset provider being communicatively coupled to a server, the method executable by the server, the method comprising:

acquiring, by the server, the unlabeled dataset from the dataset provider;

acquiring, by the server, a first candidate model from a first model provider and a second candidate model from a second model provider, the first model provider and the second model provider being communicatively coupled to the server, the first candidate model having been trained based on first training data available to the first model provider, and the second candidate model having been trained based on second training data available to the second model provider;

generating, by the server, a first usefulness score for the first candidate model and a second usefulness score for the second candidate model using the unlabeled dataset, the first usefulness score being indicative of likelihood that the first candidate model generates accurate labels for the unlabeled dataset; wherein the first usefulness score is based on at least two of: (i) a first estimation score generated using label-wise probabilities output by the first candidate model for input objects of the unlabeled dataset, (ii) a second estimation score generated using an ensemble of models trained by the first model provider based on the first training data, and (iii) a third estimation score generated using polytopes acquired from the first model provider and the second model provider;

the second usefulness score being indicative of likelihood that the second candidate model will generate the accurate labels for the unlabeled dataset;

selecting, by the server, the first candidate model as the target model using the first usefulness score and the second usefulness score; and causing, by the server, generation of the labels from the unlabeled dataset using the target model.

2. The method of claim 1, wherein the generating the first estimation score comprises:

generating, by the server employing the first candidate model, label-wise probabilities for respective input objects from the unlabeled dataset;

generating, by the server, scores for respective input objects based on the respective label-wise probabilities, the scores being indicative of how confident the first candidate model is in a given label amongst a plurality of potential labels for the respective input objects; and generating, by the server, the first estimation score based on a combination of the scores for respective input objects.

3. The method of claim 2, wherein the scores are max scores for respective input objects and the combination of scores is an average max score for the input objects.

4. The method of claim 3, wherein:

a given max score is $\alpha_x = \max_c P_\theta(\hat{y}_c|x)$; and the average max score is $$\frac{1}{|D_B|}\Sigma_{x \in D_B}\ \alpha_x,$$

and wherein:

x is an input object;

$\hat{y}_c$ is a probability of the $c^{th}$ label, among C pre-determined labels;

$P_\theta(\hat{y}_c|x)$ is a label-wise probability determined using a SoftMax function on final layer activations of a proposed model θ; and $D_B$ is the unlabeled dataset.

5. The method of claim 2, wherein the scores are entropy scores for respective input objects and the combination of scores is an average entropy score for the input objects.

6. The method of claim 5, wherein:

a given entropy score is $\beta_x = -\Sigma_c P_\theta(\hat{y}_c|x) \cdot \log P_\theta(\hat{y}_c|x)$ the average entropy score is $$\frac{1}{|D_B|}\Sigma_{x \in D_B}\ \beta_x,$$

and wherein:

x is an input object;

$\hat{y}_c$ is a probability of the $c^{th}$ label, among C labels;

$P_\theta(\hat{y}_c|x)$ is a label-wise probability determined using a SoftMax function on final layer activations of a proposed model θ; and $D_B$ is the unlabeled dataset.

7. The method of claim 1, wherein the generating the second estimation score comprises:

receiving, by the server, the ensemble of models trained by the first model provider based on the first training data and pre-determined protocols;

generating, by the server, agreement scores for respective input objects based on the ensemble of models, the agreement scores being indicative of similarity of predictions made by the ensemble of models for the respective input objects; and generating, by the server, the first usefulness second estimation score based on a combination of the agreement scores for respective input objects.

8. The method of claim 7, wherein the agreement scores are vote entropy scores for respective input objects and the combination of agreement scores is a vote entropy score for the input objects.

9. The method of claim 8, wherein:

a given vote entropy score is $$\alpha_x = -\Sigma_c \frac{V(y_c)}{M}\log\frac{V(y_c)}{M}$$

and an average vote entropy score is $$\frac{1}{|D_B|}\Sigma_{x \in D_B}\ \alpha_x,$$

and wherein:

M is a number of models in the ensemble of models;

x is an input object;

$\hat{y}_c$ is a probability of the $c^{th}$ label, among C labels;

V(yc) represents a number of votes received for the $c^{th}$ label; and $D_B$ is the unlabeled dataset.

10. The method of claim 7, wherein the agreement scores are consensus probability scores for respective input objects and the combination of agreement scores is an average consensus probability for the input objects.

11. The method of claim 10, wherein:

a given consensus probability score is $$\beta_x = \max_c \frac{1}{M}\Sigma_{m \in |M|}\ P_{\theta_m}\ (\hat{y}_c \mid x),$$

the average consensus probability score is $$\frac{1}{|D_B|}\Sigma_{x \in D_B}\ \beta_x,$$

and wherein:

$y_c$ is a probability of the $c^{th}$ label, among C labels;

$P_{\theta_m}(\hat{y}_c|x)$ is a label-wise probability determined using a SoftMax function on final layer activations of a proposed model θ;

M is a number of models in the ensemble of models; and $D_B$ is the unlabeled dataset.

12. The method of claim 1, wherein the generating the third estimation score comprises:

generating, by the server, ground-truth labels for respective input objects from the unlabeled dataset using polytopes acquired from the first model provider and the second model provider;

generating, by the server employing the first and second candidate models, predicted labels for respective input objects from the unlabeled dataset; and generating, by the server, the first usefulness score based on a comparison of the predicted labels and the ground-truth labels for respective input objects.

13. The method of claim 1, further comprising:

determining at least two of the following values for each candidate model:

an average max score $$\frac{1}{|D_B|}\Sigma_{x \in D_B}\ \alpha_x,$$

where $\alpha_x = \max_c P_\theta(\hat{y}_c|x)$;

average entropy score $$\frac{1}{|D_B|}\Sigma_{x \in D_B}\ \beta_x,$$

where $\beta_x = -\Sigma_c P_\theta(\hat{y}_c|x) \cdot \log P_\theta(\hat{y}_c|x)$;

an average vote entropy score $$\frac{1}{|D_B|}\Sigma_{x \in D_B}\ \alpha_x,$$

where $$\alpha_x = -\Sigma_c \frac{V(y_c)}{M} \log \frac{V(y_c)}{M};$$

an average consensus probability score $$\frac{1}{|D_B|}\Sigma_{x \in D_B}\ \beta_x,$$

where $$\beta_x = \max_c \frac{1}{M}\Sigma_{m \in |M|}\ P_{\theta_m}\ (\hat{y}_c \mid x);$$

where x is an input object;

$y_c$ is a probability of the $c^{th}$ label, among C labels;

V(yc) represents a number of votes received for the $c^{th}$ label;

M is a number of models in the ensemble of models; and $D_B$ is the unlabeled dataset;

and a ground truth-based usefulness score based on a comparison of predicted labels and ground-truth labels for respective input objects of the unlabeled dataset, the ground-truth labels having been generated for respective input objects from the unlabeled dataset using polytopes acquired from the first model provider and the second model provider and the predicted labels having been generated for respective input objects from the unlabeled dataset by employing the first candidate model, the first usefulness score being based on the at least two values.

14. The method of claim 1, wherein labels are classes to classify input objects included in the unlabeled dataset.

15. The method of claim 1, further comprising, subsequent to acquiring the first and second candidate models, performing a metadata-based selection to identify a subset of potential target models including the first and second candidate models.

16. The method of claim 1, wherein the causing generation of the labels from the unlabeled dataset using the target model comprises transmitting, by the server, the target model to the dataset provider for generating the labels.

17. The method of claim 1, wherein the causing generation of the labels from the unlabeled dataset using the target model comprises generating, by the server, the labels using the target model.

18. A system for selecting a target model for an unlabeled dataset of a dataset provider, the target model for generating labels for the unlabeled dataset, the system comprising:

a server for running a machine learning model (MLM) trading platform, the dataset provider being communicatively coupled to a server, the server being configured to:

acquire the unlabeled dataset from the dataset provider;

acquire a first candidate model from a first model provider and a second candidate model from a second model provider, the first model provider and the second model provider being communicatively coupled to the server, the first candidate model having been trained based on first training data available to the first model provider, and the second candidate model having been trained based on second training data available to the second model provider;

generate a first usefulness score for the first candidate model and a second usefulness score for the second candidate model using the unlabeled dataset, the first usefulness score being indicative of likelihood that the first candidate model generates accurate labels for the unlabeled dataset; wherein the first usefulness score is based on at least two of:

(i) a first estimation score generated using label-wise probabilities output by the first candidate model for input objects of the unlabeled dataset, (ii) a second estimation score generated using an ensemble of models trained by the first model provider based on the first training data, and (iii)

a third estimation score generated using polytopes acquired from the first model provider and the second model provider;

the second usefulness score being indicative of likelihood that the second candidate model will generate the accurate labels for the unlabeled dataset;

select the first candidate model as the target model using the first usefulness score and the second usefulness score; and cause generation of the labels from the unlabeled dataset using the target model.

19. The system of claim 18, wherein, in order to generate the first estimation score, the server is further configured to:

generate, by employing the first candidate model, label-wise probabilities for respective input objects from the unlabeled dataset;

generate scores for respective input objects based on the respective label-wise probabilities, the scores being indicative of how confident the first candidate model is in a given label amongst a plurality of potential labels for the respective input objects; and generate the first estimation score based on a combination of the scores for respective input objects.

20. The system of claim 19, wherein the scores are max scores for respective input objects and the combination of scores is an average max score for the input objects.

21. The system of claim 20, wherein:

a given max score is $\alpha_x = \max_c P_\theta(\hat{y}_c|x)$; and the average max score is $$\frac{1}{|D_B|}\Sigma_{x \in D_B}\ \alpha_x,$$

and wherein:

x is an input object;

$\hat{y}_c$ is a probability of the $c^{th}$ label, among C predetermined labels;

$P_\theta(\hat{y}_c|x)$ is a label-wise probability determined using a SoftMax function on final layer activations of a proposed model θ; and $D_B$ is the unlabeled dataset.

22. The system of claim 19, wherein the scores are entropy scores for respective input objects and the combination of scores is an average entropy score for the input objects.

23. The system of claim 22, wherein:

a given entropy score is $\beta_x = -\Sigma_c P_\theta(\hat{y}_c|x) \cdot \log P_\theta(\hat{y}_c|x)$ the average entropy score is $$\frac{1}{|D_B|}\Sigma_{x \in D_B}\ \beta_x,$$

and wherein:

x is an input object;

$\hat{y}_c$ is a probability of the $c^{th}$ label, among C labels;

$P_\theta(\hat{y}_c|x)$ is a label-wise probability determined using a SoftMax function on final layer activations of a proposed model θ; and $D_B$ is the unlabeled dataset.

24. The system of claim 18, wherein, in order to generate the second estimation score, the server is further configured to:

receive an ensemble of models trained by the first model provider based on the first training data and predetermined protocols;

generate agreement scores for respective input objects based on the ensemble of models, the agreement scores being indicative of similarity of predictions made by the ensemble of models for the respective input objects; and generate the first usefulness score based on a combination of the agreement scores for respective input objects.

25. The system of claim 24, wherein the agreement scores are vote entropy scores for respective input objects and the combination of agreement scores is a vote entropy score for the input objects.

26. The system of claim 25, wherein:

a given vote entropy score is $$\alpha_x = -\Sigma_c \frac{V(y_c)}{M} \log \frac{V(y_c)}{M};$$

and an average vote entropy score is $$\frac{1}{|D_B|}\Sigma_{x \in D_B}\ \alpha_x,$$

and wherein:

M is a number of models in the ensemble of models;

x is an input object;

$\hat{y}_c$ is a probability of the $c^{th}$ label, among C labels;

$V(y_c)$ represents the number of votes received for a particular given label on the input object x; and $D_B$ is the unlabeled dataset.

27. The system of claim 26, wherein the agreement scores are consensus probability scores for respective input objects and the combination of agreement scores is an average consensus probability for the input objects.

28. The system of claim 27, wherein:

a given consensus probability score is $$\beta_x = \max_c \frac{1}{M}\Sigma_{m \in |M|}\ P_{\theta_m}\ (\hat{y}_c \mid x),$$

the average consensus probability score is $$\frac{1}{|D_B|}\Sigma_{x \in D_B}\ \beta_x,$$

and wherein:

$y_c$ is a probability of the $c^{th}$ label, among C labels;

$P_{\theta_m}(\hat{y}_c|x)$ is a label-wise probability determined using a SoftMax function on final layer activations of a proposed model θ;

M is a number of models in the ensemble of models; and $D_B$ is the unlabeled dataset.

29. The system of claim 18, wherein, in order to generate the third estimation score, the server is further configured to:

generate ground-truth labels for respective input objects from the unlabeled dataset using polytopes acquired from the first model provider and the second model provider;

generate, by employing the first candidate model, predicted labels for respective input objects from the unlabeled dataset; and generate the first usefulness score based on a comparison of the predicted labels and the ground-truth labels for respective input objects.

30. The system of claim 18, wherein the server is further configured to:

determine at least two of the following values for each candidate model:

an average max score $$\frac{1}{|D_B|}\Sigma_{x\in D_B}\ \alpha_x,$$

where $\alpha_x$=max, $P_\theta$ ($\hat{y}_c$|x);

average entropy score $$\frac{1}{|D_B|}\Sigma_{x\in D_B}\ \beta_x,$$

where $\beta_x=-\Sigma_c\ P_\theta\ (\hat{y}_c|x)\cdot\log P_\theta\ (\hat{y}_c|x)$;

an average vote entropy score $$\frac{1}{|D_B|}\Sigma_{x\in D_B}\ \alpha_x,$$

where $$\alpha_x = -\Sigma_c\frac{V(y_c)}{M}\log\frac{V(y_c)}{M};$$

an average consensus probability score $$\frac{1}{|D_B|}\Sigma_{x\in D_B}\ \beta_x,$$

where $$\beta_x = ax_c\frac{1}{M}\Sigma_{m\in|M|}\ P_{\theta_m}\ (\hat{y}_c\mid x);$$

where x is an input object;

$y_c$ is a probability of the $c^{th}$ label, among C labels;

V(yc) represents a number of votes received for the $c^{th}$ label;

$P_{\theta_m}(\hat{y}_c|x)$ is a label-wise probability determined using a SoftMax function on final layer activations of a proposed model θ;

M is a number of models in the ensemble of models; and $D_B$ is the unlabeled dataset;

and a ground truth-based usefulness score based on a comparison of predicted labels and ground-truth labels for respective input objects of the unlabeled dataset, the ground-truth labels having been generated for respective input objects from the unlabeled dataset using polytopes acquired from the first model provider and the second model provider and the predicted labels having been generated for respective input objects from the unlabeled dataset by employing the first candidate model, the first usefulness score being based on the at least two values.

31. The system of claim 18, wherein labels are classes to classify input objects included in the unlabeled dataset.

32. The system of claim 18, wherein the server is further configured to, subsequent to acquiring the first and second candidate models, perform a metadata-based selection to identify a subset of potential target models including the first and second candidate models.

33. The system of claim 18, wherein, in order to cause generation of the labels from the unlabeled dataset using the target model, the server is further configured to transmit the target model to the dataset provider for generating the labels.

34. The system of claim 18, wherein in order to cause generation of the labels from the unlabeled dataset using the target model, the server is further configured to generate the labels using the target model.

* * * * *